United States Patent [19]

Jaremko et al.

[11] Patent Number: 6,047,275
[45] Date of Patent: Apr. 4, 2000

[54] FUZZY LOGIC WINDER ANALYZER

[75] Inventors: Todd R. Jaremko, Brookfield; Zhijun Liu, Menomonee Falls, both of Wis.

[73] Assignee: Allen-Bradley Company, LLC, Milwaukee, Wis.

[21] Appl. No.: 08/950,009

[22] Filed: Oct. 14, 1997

[51] Int. Cl.[7] ............................................ G06F 15/00
[52] U.S. Cl. ........................ 706/1; 706/3; 706/4; 706/8
[58] Field of Search .................... 706/1, 3, 4, 8, 706/10, 12

[56] References Cited

U.S. PATENT DOCUMENTS 5,453,672   9/1995   Avitan ..................................... 318/493
5,493,502   2/1996   Niwa ..................................... 364/474.3
5,511,371   4/1996   Kaufmann ................................. 57/264
5,675,094  10/1997   Klauber et al. ..................... 73/862.191
5,740,974   4/1998   Conzelmann ............................. 66/146

Primary Examiner—Eric W. Stamber
Assistant Examiner—Wilbert L. Starks
Attorney, Agent, or Firm—Michael Jaskolski; John J. Horn; Alexander M. Gerasimow

[57] ABSTRACT

A method and apparatus for controlling tension of a material on a winder by controlling the torque on the winder using a fuzzy logic controller which automatically determines various material and operating characteristics and adjusts torque as a function of the determined characteristics including material density, spindle inertia, material acceleration and diameter of material accumulated on a spindle.

35 Claims, 8 Drawing Sheets

FUZZY LOGIC WINDER ANALYZER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to motor controllers for use with material winders and more particularly to a fuzzy logic winder analyzer which facilitates inertia compensation and proportional-integral regulation to maintain desired tension of a material being wound by a winder.

A typical AC induction motor includes a rotor mounted for rotation inside a stator, a shaft integrally connected to the rotor and extending from the stator. The rotor includes a plurality of rotor windings and the stator includes a plurality of stator windings. To rotate the rotor, time varying voltages are applied across the stator windings causing a rotating magnetic stator field in the space including the rotor. The stator field induces (hence the term induction motor) a current in the rotor windings as the rotor windings "pass" through the stator field. The rotor current in turn generates a rotor field. The rotor and stator fields interact (e.g. attract) thereby causing a torque which rotates the rotor. Torque is a twisting force which is a function of rotor and stator field strengths and the proximity of the rotor field with respect to the stator field.

Motors are regulated by motor controllers. A motor controller usually includes an electronic processor which receives command signals indicating desired operating characteristics and generates stator voltages to drive the motor in a manner which will achieve the characteristics indicated by the command signals.

Motors are routinely used to drive material winders. A material winder is a machine used to wind thin sheet material (e.g. paper, sheet metal, sheet plastic, cloth, etc.) into rolls on spools for bulk storage and delivery. Winders are typically fed by material manufacturing machines which ideally provide sheet material at a constant line speed.

An extremely important consideration when winding material on a spool is material tension. If an ideal material tension is not maintained during winding, a resulting material roll may have any of a number of different defects. For example, if tension is to low, material may bunch on a spool causing unintended material overlap. If tension is far to low, material may even loop off the spool becoming tangled in winder hardware or becoming damaged or contaminated by contacting a floor or other proximal surface.

In addition, if tension is to high, material may rip. Ripping is a particularly important problem where the winding material is relatively delicate as in the case of most paper materials and some thin plastic materials. Moreover, if tension is to high material can become compressed or compacted on the roll as additional layers of material are added which generate a radially inward force on lower layers of material. In addition to changing the structural integrity of a material, compression can render material more susceptible to ripping when unwound for subsequent use.

To maintain a desired material tension winder motor controllers attempt to wind material on a spool at a rate which is identical to the line speed. Thus, if the line speed is 1000 feet per minute, the winder must rotate at a spindle speed such that 1000 feet per minute of material is wound. Unfortunately, the task of maintaining a constant desired command tension is frustrated by the fact that, while the line speed is ideally constant, in reality the line speed provided by material manufacturing machines often fluctuates.

To conform actual operating characteristics to command characteristics, many controllers include one or more feedback loops which provide feedback signals for comparison to command signals. For example, to maintain a desired tension, a command tension is provided to a motor controller. The controller is equipped with a sensor (e.g. a loadcell) which senses material tension and provides a tension feedback signal. The controller compares the feedback and command tension signals and generates a tension error signal. The error signal is provided to a proportional—integral (PI) regulator which generates a modified torque signal to eliminate the tension error.

A variety of different functional relationships may be implemented through the use of a PI regulator which provides a generalized function including the sum of: (1) the error signal times a proportional gain factor ("P-gain") and (2) the integral of the error signal times an integral gain factor ("I-gain"). By adjusting the P and I-gain factors, a wide variety of transfer functions may be affected, when combined with the physical transfer function of the motor system or process, to produce the desired system response.

Selecting the proper P and I-gain factors to produce a desired system response has been the subject of considerable study. If the transfer function of the physical system to be controlled is well known and may be approximated by a linear system, the appropriate P and I-gain factors may be calculated according to desired tradeoffs by a number of well known methods. More typically, however, the precise transfer characteristics of the physical system are not well known and/or are non-linear. In these cases, the proper gain factors must be approximated, typically by a human expert applying "rules of thumb". Ideally, P and I-gain factors are chosen such that tension is instantaneously controllable.

Unfortunately, while tension regulation appears to be a simple task with a tension feedback loop, time varying roll inertia complicates tension control. Roll inertia is the momentum associated with a spool and material accumulated thereon. Inertia depends on a number of different factors. First, inertia depends on the quantity of accumulated material on a spool. When there is little or no material on the spool, inertia is relatively small. However, when a spool is essentially fully loaded inertia is relatively large.

Second, inertia depends on material density. High density materials are heavier than low density materials. Therefore, given a specific roll radius and spindle speed, a high density material roll has more inertia than a low density material roll.

Third, inertia depends on spindle characteristics. Just as different materials and different accumulated material amounts affect roll inertia, spindle size and construction also affect roll inertia. A relatively heavy spindle has more inertia than a lighter spindle. A spindle with mass distributed near its circumference has more inertia than a similarly sized spindle with a more centrally concentrated mass.

Inertia directly impacts the effectiveness of a torque in modifying spindle speed. For example, when the quantity of material accumulated on a spool is small and roll inertia is small, torque required to modify spindle speed is relatively small. However, when the quantity of material accumulated on a spool is large and roll inertia is large, torque required to modify spindle speed is relatively large.

Inertia's effect on tension correction depends on the level or degree of correction required. For example, clearly given a finite acceleration period, torque required to overcome inertia and accelerate a spindle 2 p.u. within the acceleration period is greater than the torque required to overcome inertia and accelerate the spindle 1 p.u.

In addition, torque required to overcome inertia during acceleration and deceleration is affected by mechanical system friction collectively referred to herein as spindle friction. Spindle friction tends to reduce spindle speed. For this reason, friction cooperates with a decelerating torque to decelerate a spindle while it acts against an accelerating torque. For control purposes, spindle friction can be lumped together with inertia. When friction and inertia are lumped together, friction in conjunction with inertia results in an overall reduced inertia (aiding deceleration) during deceleration and an overall increased inertia (impeding acceleration) during acceleration.

Because of inertia, typical PI regulators cannot operate quickly enough to compensate for tension errors.

To compensate for the effects of inertia, many winder motor controllers have been equipped with an inertia compensator. Inertia compensators compensate for system nuances and material characteristics by providing a torque correction to be added to the torque signal provided by the PI regulator. The resulting modified torque signal is used to drive the winder motor. To this end, the compensator is provided with various material specific constants indicating material characteristics, receives several feedback signals indicating instantaneous system characteristics and uses the constants and signals to generate the torque correction signal. The constants often include material density, material width (i.e. the width of a material roll), a spindle inertia constant indicating inertia associated solely with an empty spindle and acceleration and deceleration "kicker" signals indicating how the correction torque should be modified to account for spindle acceleration and deceleration. The feedback signals often include material line speed and roll diameter.

While inertia compensators work well to compensate for roll inertia and friction, they have a number of shortcomings. First, many winders are used to wind several different types of material at different times. Where materials to be wound have different characteristics, during a commissioning procedure, a winder operator must identify material characteristics and program the compensator to compensate for the characteristics. In addition, spindle inertia must be derived and the acceleration and deceleration kickers have to be adjusted when spindles are changed. Moreover, P and I-gain factors have to be determined for new spindle and material combinations. While identifying material and system characteristics may not be extremely burdensome where material and spindle changes are irregular, in many industries changes are routine and characteristic identification and controller programming become tedious.

Second, often material characteristics are not precisely known. For example, with sheet steel there are many different grades of material, each grade having a material density within a steel density range. In the case of steel, instead of knowing the exact density of sheet steel, an operator typically selects a density from within the density range which is then used by the inertia compensator for tension control. While the selected density may fortuitously be accurate, often the selected value will have some error. In this case, tension control may be imperfect.

Third, even after a material characteristic is determined, the material provided by a manufacturing machine for winding may change slightly such that the determined characteristic is no longer valid. For example, even after density is correctly determined and during winding, density of material provided may change slightly. Where density change is not accounted for, the inertia compensator can generate an incorrect torque correction thereby causing an incorrect material tension.

Therefore, it would be advantageous to have a controller which receives standard winder feedback signals, uses those signals to automatically determine material characteristics and operating characteristics and which can automatically adjust motor operation based on the automatically determined characteristics to affect a desired tension without requiring a prolonged and tedious commissioning procedure.

BRIEF SUMMARY OF THE INVENTION

The present invention includes a method and apparatus for use with a motor controller including a PI regulator and an inertia compensator. The invention includes a fuzzy logic analyzer which receives various command signals and feedback signals and, based on the received signals, modifies a motor driving torque signal as a function of a set of fuzzy logic rules to cause a desired material tension. The analyzer modifies the torque signal by automatically identifying P and I-gain factors, a spindle inertia factor, material density and acceleration and deceleration kicker signals. The P and I-gain factors are provided to the PI regulator while the spindle inertia SI, material density MD and acceleration and deceleration kicker signals, WKA and WKD, respectively, are provided to the inertia compensator.

A primary object of the invention is to reduce the manual steps required to identify material and system characteristics during a commissioning procedure. A related object is to decrease commissioning procedure time. The inventive analyzer can automatically derive essentially all required material and system characteristics (except material width along length of spindle and spindle diameter $D_0$) thereby reducing manual commissioning steps and required time.

Another object is to provide a system which automatically tunes P and I-gain factors as well as precisely determines material density so that tension correction time is minimized. The inventive analyzer adjusts P and I-gain factors on the fly to accommodate material and system changes. In addition, the analyzer constantly monitors material density during operation for changes (e.g., new material being wound) to ensure proper tension.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

A. Theory

Figure 1:
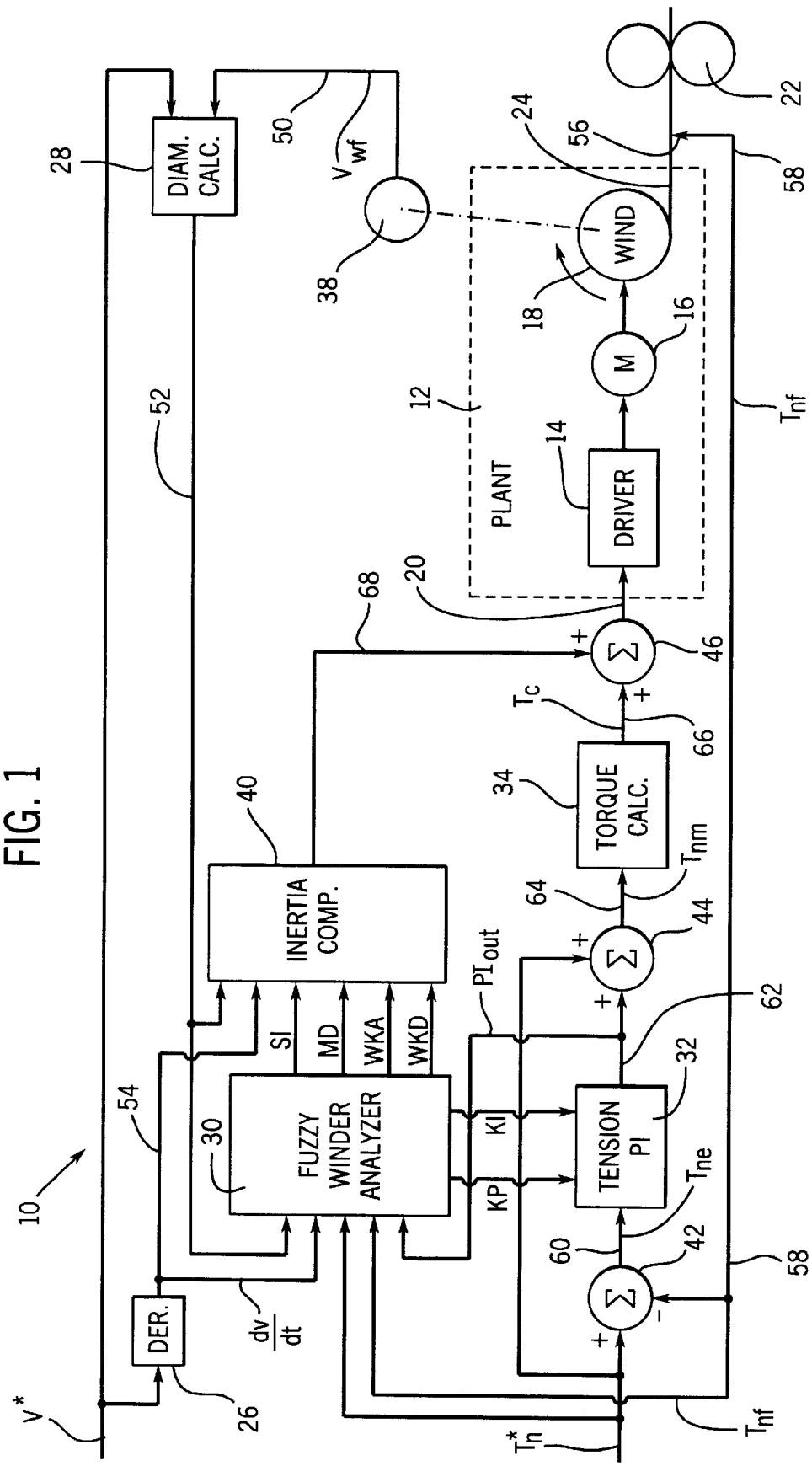
FIG. 1 is a schematic diagram of a controller including a fuzzy winder analyzer according to the present invention.

Instead of requiring a winder operator to use "rules of thumb" to determine material and system characteristics manually prior to motor operation and to program a controller with the determined characteristics, the present invention uses a fuzzy logic controller to automatically determine material and system characteristics thereby facilitating a simplified commissioning procedure.

The present controller includes both a PI regulator and an inertia compensator which cooperate to modify motor torque thereby controlling material tension essentially instantaneously. The PI regulator receives a tension error signal indicating the difference between command and feedback tension signals and steps up the error signal as a function of both P and I-gain factors as well known in the art. The PI regulator generates a regulator output signal PIout. Signal PIout is added to the command tension signal producing a modified tension signal. The modified tension signal is converted into a command torque signal for motor control. Thus, when there is a tension error the command torque signal is modified to eliminate the error signal. The PI regulator does not compensate for roll inertia and therefore the period required for tension correction using only the regulator can be unacceptably long.

The inertia compensator compensates for roll inertia and thereby shortens the correction period. The compensator compensates by generating a torque correction signal which is added to the command torque signal generating a modified torque signal for driving the winder motor.

To provide an appropriate torque correction signal $T_{cor}$, the inertia compensator solves the following equation:

$$T_{cor} = [MI + SI] \cdot \zeta \qquad \text{Eq. 1}$$

where MI is the torque required to compensate for inertia associated with accumulated material on a spindle, SI is the torque required to compensate for spindle inertia and $\zeta$ is either an acceleration kicker signal WKA or a deceleration kicker signal WKD, depending on whether or not the spindle has to be accelerated or decelerated, respectively. MI can be expressed as:

$$MI = \frac{(WK^2)N}{308t} \qquad \text{Eq. 2}$$

where W is the material p.u. weight, K is the radius of gyration of accumulated material in feet, N is a change in spindle speed in rotations per minute and t is the number of seconds to complete the change in speed N. N/t can be expressed as:

$$\frac{N}{t} = FMS \left[ \frac{12 \text{ inches}}{\text{foot}} \right] \left[ \frac{Roll\ Rev}{\pi D_1} \right] \left[ \frac{G \cdot Motor\ Rev}{Roll} \right] \qquad \text{Eq. 3}$$

where FMS is spindle speed in feet per minute per second, G is a gear ratio and $D_1$ is the outer diameter of material accumulated on the spindle. Weight W can be expresses as:

$$W = \rho \omega (D_1^2 - D_0^2) \pi \qquad \text{Eq. 4}$$

where $\rho$ is material density, $\omega$ is material width (i.e. material dimension along the length of the spool) and $D_0$ is the unloaded spindle diameter. Radius K is expressed as:

$$K^2 = \frac{D_0^2 + D_1^2}{4} \qquad \text{Eq. 5}$$

Combining Equations 1 through 5, correction torque $T_{cor}$ can be expressed as:

$$T_{cor} = \left[ \frac{\rho \omega (D_1^4 - D_0^4) FMS}{4(144)(80.63) D_1} + SI \right] \cdot \zeta \qquad \text{Eq. 6}$$

Thus, the compensator solves Eq. 6 to derive the correction torque.

To account for spindle inertia, material density, roll diameter, material acceleration, and the degree of acceleration or deceleration, the inertia compensator requires six compensation signals in the form of inputs. A first input is the roll diameter signal indicating the instantaneous outer diameter $D_1$ of a material roll. A second input is an acceleration signal $$\frac{dv}{dt}$$

indicating acceleration of the material line. A third input is a material density MD (or $\rho$) signal indicating the density of the material being wound. A fourth input is a spindle inertia signal SI indicating the inertia of the spindle. The fifth and sixth inputs are acceleration and deceleration kicker signals WKA and WKD, respectively.

The roll diameter $D_1$ and acceleration $$\frac{dv}{dt}$$

signals are provided by a diameter calculator and a line speed derivative calculator or acceleration calculator, respectively, as well known in the art.

According to the present invention, the spindle inertia and acceleration and deceleration kicker signals are derived using a fuzzy logic analyzer which receives a plurality of tuning signals initially during an abbreviated commissioning procedure wherein no material is accumulated on the spindle. Then during normal winder operation, the analyzer receives tuning signals and automatically generates and updates material density and acceleration and deceleration kicker signals. Thus, material characteristics and system characteristics are automatically derived and routinely updated to ensure a constant material tension as desired.

B. Hardware and Operation

1. Controller Generally

Referring now to the drawings, wherein like reference characters represent identical elements throughout the several views, and more specifically referring to FIG. 1, the inventive controller 10 is described in the context of a material winder plant 12. Plant 12 includes a driver 14, a motor 16 and a winder 18 having a spindle (not illustrated).

Driver 14 receives a torque signal from controller 10 on line 20 and generates voltages which provide torque to motor 16. Motor 16 in turn drives winder 18 which receives material 24 for winding from a lead roll 22. Material 24 is provided at a line speed $V_L$ in feet per minute (FPM). Winder 18 is driven at N rotations per minute such that $V_L$ feet of material are wound every minute.

Controller 10 receives a command line speed signal v* and a command tension signal Tn* and uses those signals in conjunction with various feedback signals to derive the torque signal on line 20. Controller 10 includes an acceleration calculator 26, a diameter calculator 28, a fuzzy winder analyzer 30, a tension PI regulator 32, a torque calculator 34, a speed encoder 38, an inertia compensator 40, and several summers 42, 44, 46 and 48 and various other components, lines and buses described in more detail below.

Encoder 38 monitors the position of winder 18 and generates a winder speed feedback signal Vwf on line 50. Signal Vwf is provided to diameter calculator 28. Calculator 28 also receives speed command signal v* and uses signals Vwf and v* to generate a roll diameter signal $D_1$ on line 52. The outer diameter of the roll can be determined according to the following equation:

$$D_1 = v * / (Vwf *) * \frac{12 \text{ inches}}{\text{foot}} \qquad \text{Eq. 7}$$

Calculator 26 receives command speed signal v* and provides the derivative dv/dt of line speed as an acceleration signal on line 54.

A sensor (e.g., a load cell) 56 senses tension of material 24 and generates a tension feedback signal Tnf on line 58. Summer 42 receives and subtracts tension feedback signal Tnf from tension command signal Tn* generating a tension error signal Tne on line 60. Regulator 32 receives error signal Tne and P and I-gain factors KP and KI, respectively, and modifies signal Tne as well known in the art generating regulator output signal PIout on line 62.

Summer 44 receives and sums signal PIout and command tension signal Tn* generating a modified tension signal Tnm on line 64. Calculator 34 receives modified signal Tnm and generates a command torque signal Tc on line 66.

Analyzer 30 receives tuning signals including diameter signal $D_1$, acceleration signal dv/dt, command tension signal Tn*, feedback tension signal Tnf and regulator output signal PIout and uses those signals to provide a spindle inertia signal SI, a material density signal MD and acceleration and deceleration kicker signals WKA and WKD, respectively. In addition, analyzer 30 generates P and I-gain factors KP and KI for controlling regulator 32. The SI, MD WKA and WKD signals are provided to compensator 40 for generating a correction torque signal Tcor according to Equation 6 above.

2. Fuzzy Winder Analyzer

Figure 2:
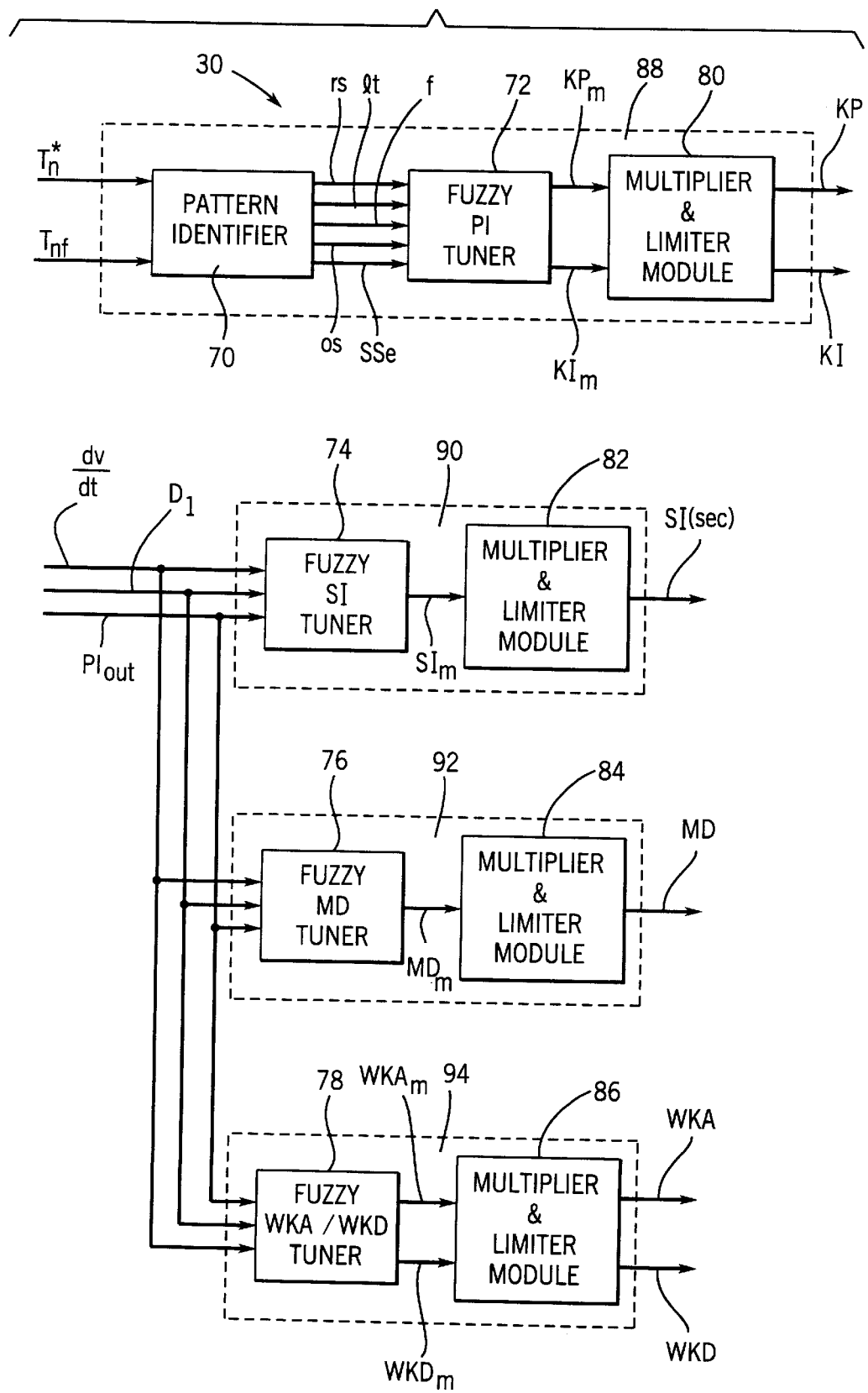
FIG. 2 is a block diagram illustrating details of the analyzer of FIG. 1.

Referring to FIGS. 1 and 2, analyzer 30 includes a pattern identifier 70, four fuzzy tuners including a PI tuner 72, an SI tuner 74, an MD tuner 76 and a WKA/WKD tuner 78, and four multiplier and limiter modules 80, 82, 84 and 86.

Identifier 70 receives command tension signal Tn* and feedback signal Tnf and analyzes those signals to determine how well instantaneous P and I-gains KP and KI, respectively, are compensating for tension error. To this end, identifier 70 identifies several different signal characteristics including risetime rs, longtime lt, overshoot os, oscillation frequency f and steady state error sse.

Figure 3:
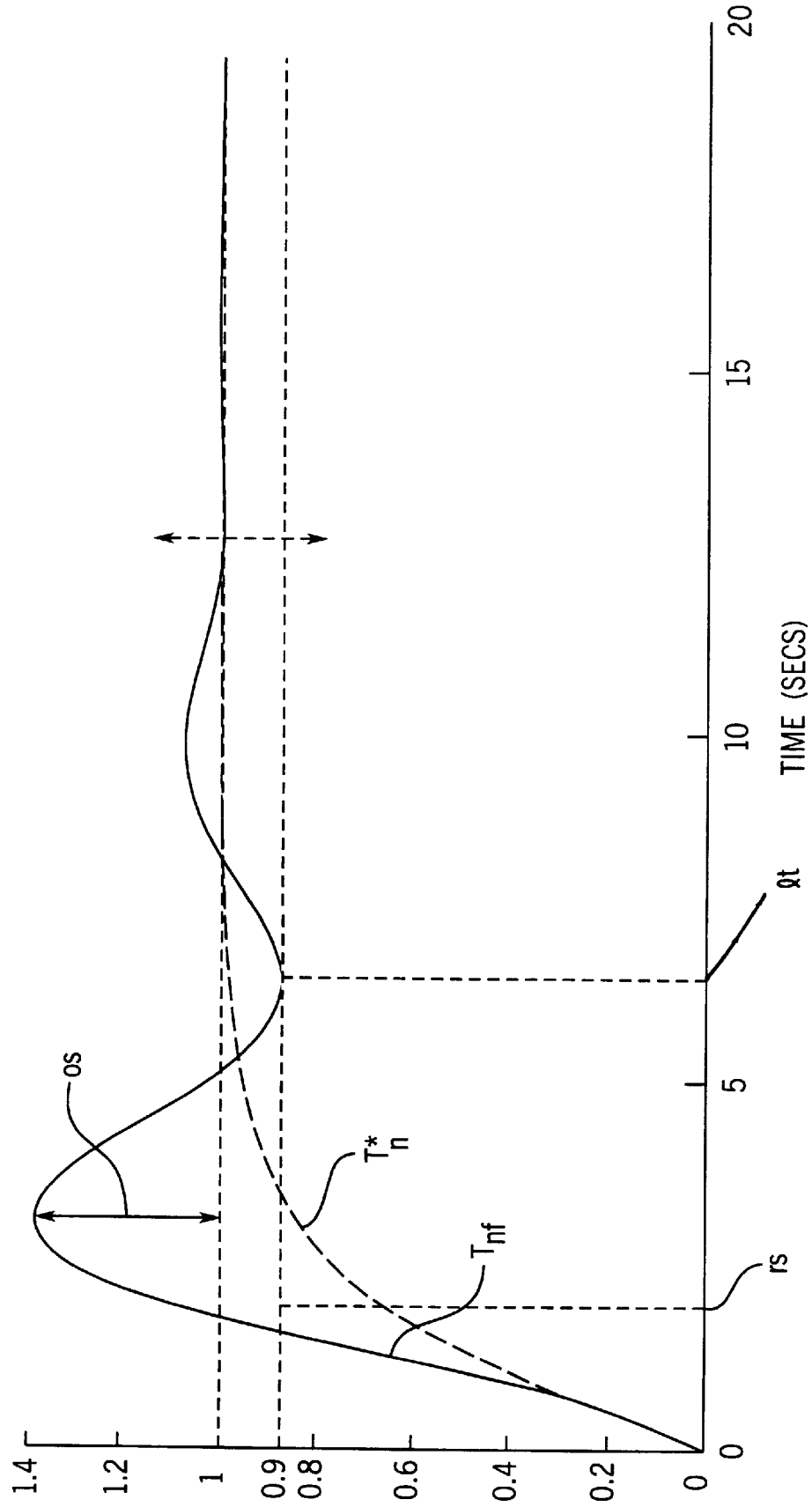
FIG. 3 is a graph illustrating a command tension and a tension feedback signal which are used by the pattern identifier of FIG. 2 to derive risetime, longtime, frequency, overshoot and steady-state error signals.

Referring to FIG. 3, a step shaped tension command signal Tn* and a resulting tension feedback signal Tnf are illustrated. Risetime rs, overshoot os, and longtime lt are all identified.

Risetime rs is the actual risetime minus the desired risetime divided by the desired risetime where all times are in seconds and the actual risetime is the time required for feedback signal Tnf to reach 90% of command signal Tn*. The desired risetime is specified by a controller operator.

Longtime lt is the actual longtime divided by the desired risetime where the actual long time or settling time is the time required for feedback signal Tnf to settle to 90% of command signal Tn*.

Overshoot os is the percent by which feedback signal Tnf actually exceeds command signal Tn* at its maximum amplitude.

Frequency f is the number of times feedback signal Tnf crosses signal Tn* from negative to positive during a test interval.

Steady state error sse is the error scaled to a percent of the command signal Tn*. All signals rs, lt, os, f and sse are provided to fuzzy PI tuner 72.

A. PI Tuner

Figure 4:
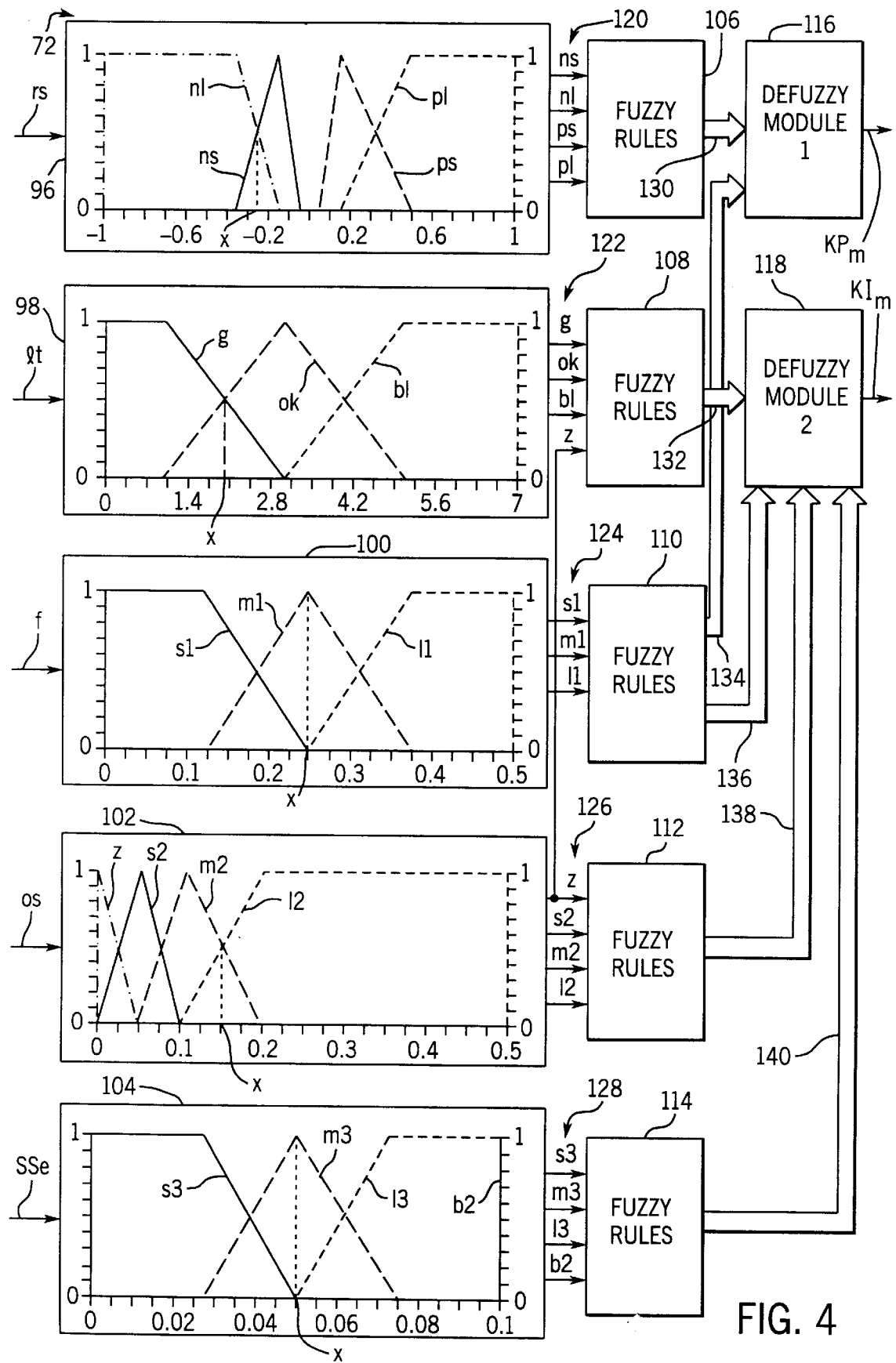
FIG. 4 is a block diagram illustrating the PI tuner of FIG. 2.

Referring also to FIG. 4, tuner 72 receives signals rs, lt, os, f and sse and uses those signals to produce multiplier signals KPm and KIm for changing the P and I-gains, respectively, based on a set of fuzzy membership functions and fuzzy rules. Tuner 72 includes membership function sets 96, 98, 100, 102 and 104, fuzzy rule sets 106, 108, 110, 112 and 114 and two defuzzing modules including a proportional defuzzing module and an integral defuzzing module 116 and 118, respectively.

Risetime signal rs is received by a risetime membership function set 96, longtime signal lt is received by a longtime membership function set 98, frequency signal f is received by a frequency membership function set 100, overshoot signal os is received by an overshoot membership function set 102 and steady state signal sse is received by a steady state membership function set 104. Each membership function set has a domain which spans the expected range of received signals and a normalized range between zero and one. Each membership function and the number of membership functions may be varied as understood by those of ordinary skill in the art.

In the interest of simplifying this explanation, although each of sets 96, 98, 100, 102 and 104 are different, because each set operates in essentially the same manner, only operation of set 96 will be explained here in detail and, where necessary, differences between sets 98, 100, 102 and 104 will be identified.

Risetime membership function set 96 comprises four membership functions designated negative small ns, negative large nl, positive small ps and positive large pl corresponding generally to the fuzzy concepts of a negative small risetime, a negative large risetime, a positive small risetime and a positive large risetime, respectively.

The ns membership function rises from a value of zero for negative risetime of approximately −0.35 to a value of one for risetime of −0.15 and falls again to a zero value for risetime −0.05. The ps membership function rises from a value of zero for positive risetime of approximately 0.05 to a value of one for risetime of 0.15 and falls again to a zero value for risetime 0.5. The nl membership function ranges linearly from a value of one for risetimes that are negative and less than −0.35, and then varies linearly from one to zero between −0.35 to −0.15. The pl membership function ranges linearly from a value of one for risetimes that are greater than 0.55, and varies linearly from zero to one between 0.15 to 0.55.

In operation, for a given value of risetime rs, the risetime membership function set 96 provides four membership function values 120, one value for each of the membership functions in set 96. Thus, set 96 provides values ns, nl, ps and pl which depend on the value (between 0 and 1) of each membership function for the given risetime.

As shown in FIG. 4, if risetime rs is less than −0.35, value nl will be one and values ns, ps and pl will be zero. If risetime rs is between −0.35 and −0.15, value nl will be between zero and one, value ns will be between zero and one and values ps and pl will be zero. If risetime rs is between −0.15 and −0.05, value ns will be between zero and one and values nl, ps and pl will be zero. If risetime rs is between −0.05 and 0.05, all values ns, nl, ps and pl will be zero. If risetime rs is between 0.05 and 0.15, value ps will be between zero and one and the other values will be zero. If risetime rs is between 0.15 and 0.5 values ps and pl will be between zero and one and values ns and nl will be zero. If risetime rs is greater than 0.5, value pl will be one and all other values will be zero.

Set 96 therefore continuously categorizes risetime rs according to the fuzzy concepts of negative large, negative small, positive small and positive large.

Referring still to FIG. 4, function set 98 is like set 96 except that, instead of including four membership functions, set 98 only includes three and the domain of values is different. Set 98 functions include good g, fair ok and bad b1 and each corresponds to an output membership value g, ok and b1, respectively. Values g, ok and b1 are collectively referred to by the numeral 122.

Function set 100 is also like set 96 except that set 100 only includes three functions, the domain is different and the functions have different shapes. Set 100 functions include small s1, medium m1 and large l1 and each corresponds to an output membership value s1, m1 and l1, respectively. Values s1, m1 and l1 are collectively referred to by the numeral 124.

Function set 102 is also like set 96 except that the domain is different and the functions have different shapes. Set 102 functions include zero z, small s2, medium m2 and large l2 and each corresponds to an output membership value z, s2, m2 and l2, respectively. Values z, s2, m2 and l2 are collectively referred to by the numeral 126.

Function set 104 is also like set 96 except that set 104 includes four functions, the domain is different and the functions have different shapes. Set 104 functions include small s3, medium m3, large l3 and big b2 and each corresponds to an output membership value s3, m3, l3 or b2, respectively. Values s3, m3, l3 and b2 are collectively referred to by the numeral 128.

Referring still to FIG. 4, membership values 120, 122, 124, 126 and 128 are provided to fuzzy rule sets 106, 108, 110, 112 and 114, respectively. Outputs of sets 106, 108, 110, 112 and 114 are provided to modules 116 and 118 via busses 130, 132, 134, 136, 138 and 140. Rule sets 106, 108, 110, 112 and 114 are as follows.

Rule set 106 determines how to change KP as a function of risetime rs and includes the rules:

(1) If rs is positive small then KP=ps*K1.5;

(2) If rs is positive large then KP=pl*K2;

(3) If rs is negative small then KP=ns*K.666; and (4) If rs is negative large then KP=nl*K.5.

Rule set 108 determines how to change KI as a function of longtime lt and overshoot os and include the rules:

(5) If lt is good and os is zero then KI=zero;

(6) If lt is ok and os is zero then KI=ok*K1.5; and (7) If lt is bad and os is zero then KI=b1*K2.

Rule set 110 determines how to change KP as a function of frequency f and include the rules:

(8) If f is small then KP=zero;

(9) If f is medium then KP=m1*K.666; and

(10) If f is large then KP=l1*K.5.

Rule set 110 also determines how to decease KI as a function of frequency and include the rules:

(11) If f is small then KI=zero;

(12) If f is medium then KI=m1*K.666; and

(13) If f is large then KI=l1*K.5.

Rule set 112 determines how to decrease KI as a function of overshoot os and include the following rules:

(14) If os is zero and f is small, then KI=zero;

(15) If os is small the KI=s2*K.666;

(16) If os is medium then KI=m2*K.5; and

(17) If os is large then KI=l2* K.25.

Rule set 114 determines how to increase KI as a function of steady state error sse and include the following rules:

(18) If sse is medium then KI=m3*K1.5;

(19) If sse is large then KI=l3*K2; and

(20) If sse is big then KI=b2*K4.

In all rules 1 through 20, K is the present value of the P or I-gain factor. To apply rules 1 through 20, where a membership function value is non-zero, the membership function value is modified as indicated in the rules. The modified membership values are provided to modules 116 and 118.

Module 116 performs a two step "defuzzing" procedure to provide a KP multiplier KPm. First, module 116 adds all membership values received from rule set 106 generating a first dKP modifier. Similarly, module 116 adds all membership values received from rule set 110 generating a second dKP modifier. Second, module 116 adds the dKP modifiers and divides the sum by the total number of modifiers received. In this example there are only the first and second modifiers and therefore the first and second modifiers are added and the sum is divided by two to generate multiplier KPm.

Similarly, module 118 performs a two step "defuzzing" procedure to provide a KI multiplier KIm. First, module 118 adds all membership values received from rule set 108 generating a first dKI modifier. Module 118 adds all membership values received from rule set 110 generating a second dKI modifier. Third and Fourth dKI modifiers are generated by adding all membership values received from rule sets 112 and 114, respectively. Second, module 118 adds the dKI modifiers and divides the sum by the total number of modifiers received. Here, there are four dKI modifiers and therefore the sum is divided by four to generate multiplier KIm.

An example of how the membership function sets and rules operate is instructive. Consider a case where risetime rs is −0.25, longtime lt is 1.9, frequency f is 0.25, overshoot os is 0.15 and steady state error sse is 0.05. These points are identified on the membership function sets 96, 98, 100, 102 and 104 as points X (see FIG. 4).

To derive the first dKP modifier, refer to function set 96 and rule set 106. In this example, the risetime membership function set 96 yields values nl=0.5, ns=0.5, ps=0 and pl=0. According to fuzzy rule set 106 (i.e. rules 1 through 4 above) rule 4 and rule 3 apply to values nl and ns, respectively, and rules 1 and 2 each yield membership output values of zero.

With respect to value nl, according to rule 4 value nl is multiplied by K.5 such that the modified membership value is K.25 (i.e.=nl*K.5=0.5*K.5). Similarly, with respect to value ns, according to rule 3 value ns is multiplied by K.666 such that the modified membership value is K.333 (i.e.= ns*K.666=0.5* K.666).

Modified membership values K.25 and K.333 are provided to module 116 via bus 130. When values K.25 and K.333 are received, module 130 adds the values generating the first dKP modifier K.583.

To derive the second dKP modifier, refer to function set 100 and rule set 110. In this example, because frequency f is at 0.25, frequency set 100 yields values s1=0, m1=1.0 and l1=0. Referring to rule set 110 (rules 8 through 10 above), rule 9 applies for finding a modified membership value corresponding to m1 while rules 8 and 10 each yield membership output values of zero.

According to rule 9 value m1 is multiplied by K.666 such that a corresponding modified membership value is K.666 (i.e.=m1*K.666=1.0*K.666). Membership value K.666 is provided on bus 134. Because only one value is received on bus 134, value K.666 is the second dKP modifier.

To derive the first dKI modifier, refer to function set 98 and rule set 108. Because longtime lt is 1.9, longtime set 98 yields values g=0.5, ok=0.5 and b=0. However, none of fuzzy rule set 108 (i.e. rules 5, 6 and 7 above) applies if the overshoot os is not zero. Here, the overshoot is 0.15 (see function set 102) and therefore no dKI modifier signal is provided on bus 132 (i.e. the first dKI modifier in not provided).

To derive the second dKI modifier, refer to function set 100 and rule set 110. In this example, because f is 0.25, frequency set 100 yields values s1=0, m1=1.0 and l1=0, and rule 12 applies.

According to rule 12 value m1 is multiplied by K.666 generating a corresponding modified membership value K.666 (i.e.=m1*K.666=1.0*K.666). Value K.666 is provided on bus 136 and becomes the second dKI modifier.

To derive the third dKI modifier refer to function set 102 and rule set 112. In this example, because overshoot OS is 0.15, overshoot set 102 yields values z=0, s2=0 and m2 and l2=0.5, and rules 16 and 17 apply.

With respect to value m2, according to rule 16 value m2 is multiplied by K.5 such that a resulting corresponding modified membership value is K.25 (i.e.=m2*K.5= 0.5*K.5). Similarly, with respect to value l2, according to rule 17 value l2 is multiplied by K.25 such that a resulting corresponding modified membership function is K.125 (i.e.= m1*K.25=0.5*K.25).

Modified membership values K.25 and K.125 are provided to module 118 via bus 138. When values K.25 and K.125 are received, module 118 adds the values generating the third dKI modifier K.375.

To derive the fourth dKI modifier, refer to function set 104 and rule set 114. In this example, because sse is 0.05, according to membership set 114, m3 is 1.0 and s3, l3 and b2 are zero. Then, according to rule 18, value m3 is multiplied by K1.5 such that a resulting corresponding modified membership value is K1.5 (i.e., m3*K1.5=K1.5). Modified membership K1.5 is provided to module 118 via bus 140. Value K1.5 is the fourth dKI modifier.

In total, module 116 calculates first and second dKP modifiers K.583 and K.666 while module 118 calculates three dKI modifiers including the second K.666, third K.375 and fourth K1.5.

To generate a KP multiplier KPm, module 116 adds received dKP modifiers and then divides the sum by the number of modifiers received. In the above example, module 116 adds K.583 and K.666 and divides by two to generate a KP multiplier KPm of K.628. Similarly, to generate a KI multiplier KIm, modifier 118 adds received dKI modifiers and then divides the sum by the number of modifiers received. In the above example, module 118 adds K.375, K.666 and K1.5 and then divides by three to generate a KI multiplier KIm of K.847.

Referring again to FIG. 2, multipliers KIm and KPm are provided to module 80 for additional processing.

Initially, module 80 is provided with typical KP and KI gain factors which might be expected given winder and other system characteristics. The typical KP and KI factors are stored as initial KP and KI factors. During operation, when module 80 receives multipliers KPm and KIm, module 80 multiplies the multipliers KPm and KIm by initial gain factors KP and KI, respectively, generating updated P and I-gain factors. The updated P and I-gain factors replace the initial factors and are also provided to PI tuner 32 (see FIG. 1) for control purposes.

B. Spindle Inertia (SI) Tuner

Figure 5:
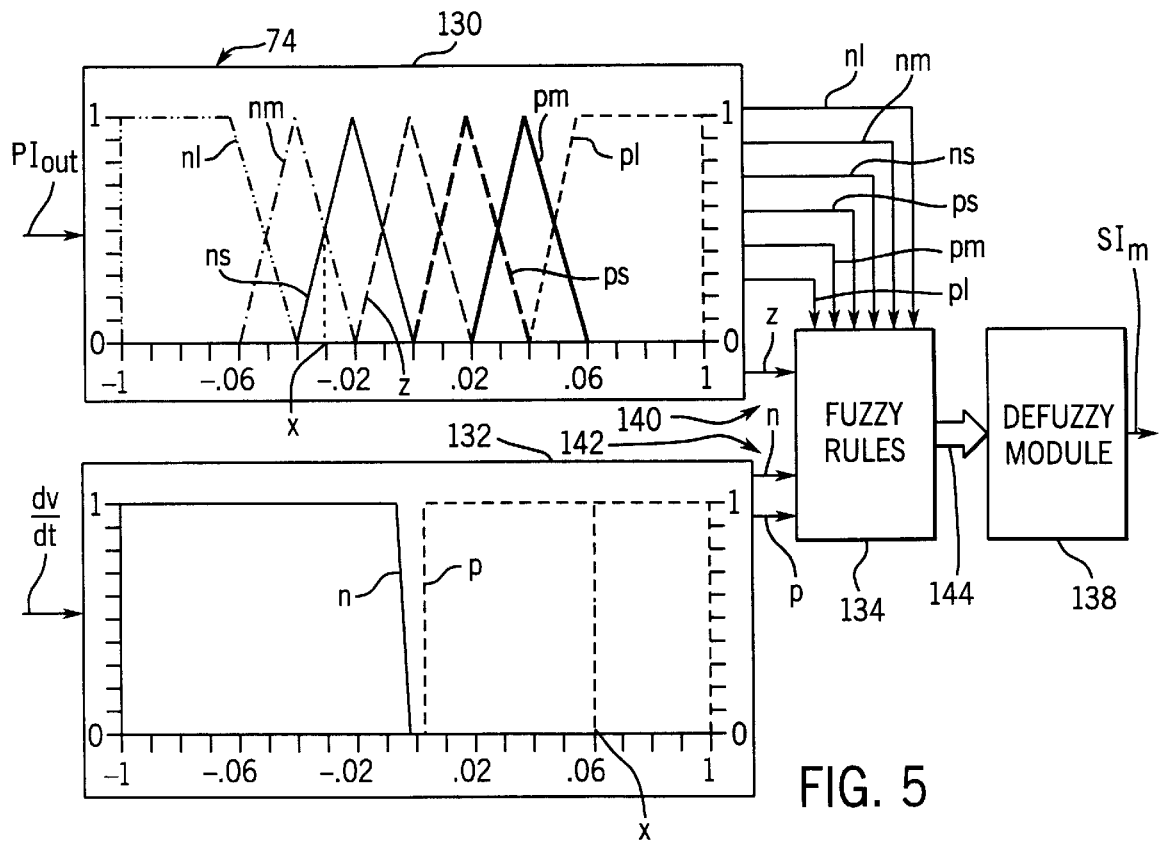
FIG. 5 is a block diagram illustrating the SI tuner of FIG. 2.

Referring to FIGS. 2 and 5, SI tuner 74 receives acceleration signal dv/dt, diameter signal $D_1$ and regulator output signal PIout and uses those signals to generate an SI multiplier signal SIm based on a set of fuzzy membership functions and fuzzy rules. Tuner 74 includes membership function sets 130 and 132, a fuzzy rule set 134 and a defuzzing module 138.

Signal PIout is received by function set 130 while signal dv/dt is received by set 132. Each membership function set has a domain which spans the expected range of received signals and a normalized range between zero and one.

Function set 130 comprises seven membership functions designated negative small ns, negative medium nm, negative large nl, positive small ps, positive medium pm and positive large pl corresponding generally to the fuzzy concepts of a negative small PI output, a negative medium PI output, a negative large PI output, a positive small PI output, a positive medium PI output and a positive large PI output, respectively.

In operation, for a given value of signal PIout, function set 130 provides seven membership function values 140, one value for each of the membership functions in set 130. Thus, set 130 provides values ns, nm, nl, ps, pm and pl whose exact values depend on the value of each membership function for the given PIout signal.

Function set 132 is like set 130 except that, instead of including seven membership functions, set 132 only includes two functions, positive and negative, each corresponding to a unique set 132 output, p and n, respectively. Membership values p and n are collectively referred to by the numeral 142.

Membership values 140 and 142 are provided to fuzzy rule set 134 which generates modified membership values. The modified membership values are provided to module 138 via a bus 144.

Rule set 134 includes rules indicating how signal SI should be changed to compensate for changing spindle inertia. Set 134 includes two rule sub-sets. A first sub-set includes rules to determine a spindle inertia change when the line speed is increasing (i.e. during acceleration). A second sub-set includes rules to determine a spindle inertia change when the line speed is decreasing (i.e. during deceleration). The first sub-set includes the following rules:

(21) If PIout is zero then a corresponding modified membership value is zero;

(22) If dv/dt is positive and PIout is negative large then a corresponding modified membership value is (q*K.25) where q is the lesser of nl and p. This is because, in the context of this and most fuzzy controllers, the conjunction "AND" is interpreted as taking the minimum of two membership values connected by the word "AND". Thus, in this rule, the smaller of the membership value of the dv/dt signal and the membership value of the nl signal is taken as the argument by which the output membership functions associated with the fuzzy logic are scaled.

(23) If dv/dt is positive and PIout is negative medium then a corresponding modified membership value is (q*K.5) where q is the lesser of nm and p;

(24) If dv/dt is positive and PIout is negative small then a corresponding modified membership value is (q*K.666) where q is the lesser of ns and p;

(25) If dv/dt is positive and PIout is positive small then a corresponding modified membership value is (q*K1.5) where q is the lesser of ps and p;

(26) If dv/dt is positive and PIout is positive medium then a corresponding modified membership value is (q*K2) where q is the lesser of pm and p; and

(27) If dv/dt is positive and PIout is positive large then a corresponding modified membership value is (q*K4) where q is the lesser of pl and p.

The second sub-set includes the following rules:

(28) If dv/dt is negative and PIout is negative large then a corresponding modified membership value is (q*K4) where q is the lesser of nl and n;

(29) If dv/dt is negative and PIout is negative medium then a corresponding modified membership value is (q*K2) where q is the lesser of nm and n;

(30) If dv/dt is negative and PIout is negative small then a corresponding modified membership value is (q*K1.5) where q is the lesser of ns and n;

(31) If dv/dt is negative and PIout is positive small then a corresponding modified membership value is (q*K.666) where q is the lesser of ps and n;

(32) If dv/dt is negative and PIout is positive medium then a corresponding modified membership value is (q*K.5) where q is the lesser of pm and n; and

(33) If dv/dt is negative and PIout is positive large then a corresponding modified membership value is (q*K.25) where q is the lesser of pl and n.

To apply rules 21 through 33, where a membership value (i.e. nl, nm, ns, ps, pm, pl or z) is non-zero, the membership value is modified as indicated in the rules. For example, assume signal PIout has a value −0.3 as indicated by point X (see FIG. 5). Also assume that signal dv/dt has a value 0.6 indicated by point X in function set 132.

In this case, referring still to FIG. 5 and specifically to points X, membership values nm and ns would each be 0.5 and all other membership values (i.e. nl, ps, pm, pl and z) would be zero. In addition membership value p is 1.0 and value n is zero (see function set 132). Quantity p is 1.0. Both nm and ns are less than quantity p.

Only rules 23 and 24 apply. According to rule 23, the modified membership value is K.25 (i.e.=nm*K.5=0.5*K.5). According to Rule 24, the corresponding modified membership value is K.333 (i.e.=ns*K.666=0.5*K.666).

Referring still to FIG. 5 note that if dv/dt is essentially zero, the (n+p) term in rules 22 through 33 is zero which renders the modified membership value zero.

Modified membership values K.25 and K.333 are provided to module 138. Module 138 adds modified membership values received thereby generating an SI multiplier SIm.

Referring again to FIG. 2, multiplier SIm is provided to module 82 for additional processing. Initially, module 82 is provided with a typical SI value which might be expected given winder and other system characteristics. The typical SI value is stored as an initial SI value. During operation, when module 82 receives multiplier SIm, module 82 multiplies multiplier SIm by the initial SI value, generating an updated SI value. The updated value replaces the initial SI value and is also provided to compensator 40 (see FIG. 1) for control purposes.

C. Material Density Tuner

Figure 6:
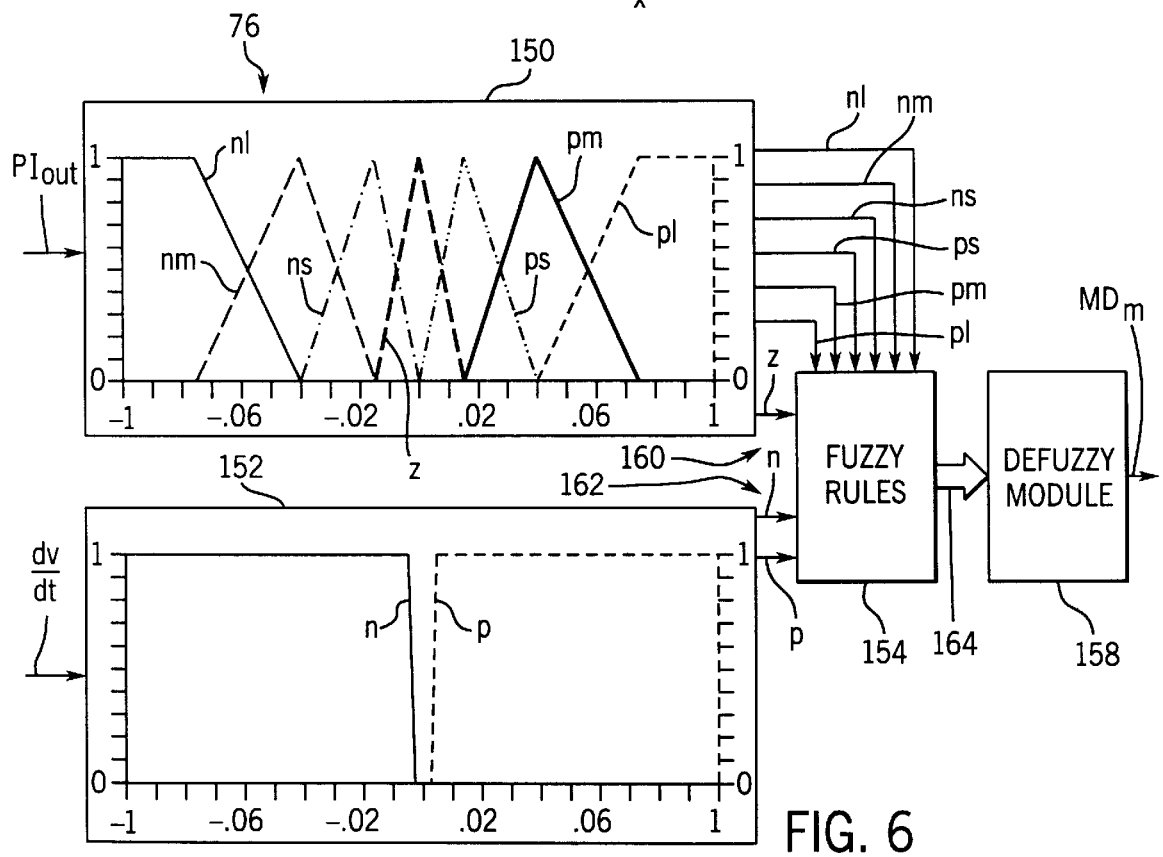
FIG. 6 is a block diagram illustrating the MD tuner of FIG. 2.

Referring to FIGS. 2 and 6, material density tuner 76 receives acceleration signal dv/dt, diameter signal $D_1$ and signal PIout and uses those signals to generate a material density multiplier MDm based on a set of fuzzy membership functions and fuzzy rules. Tuner 76 includes membership function sets 150 and 152, a fuzzy rule set 154 and a defuzzing module 158.

Signal PIout is received by function set 150 while signal dv/dt is received by set 152. Each membership function set has a domain which spans the expected range of received signals and a normalized range between zero and one.

Function set 150 comprises seven membership functions designated negative small ns, negative medium nm, negative large nl, positive small ps, positive medium pm and positive large pl corresponding generally to the fuzzy concepts of a negative small PI output, a negative medium PI output, a negative large PI output, a positive small PI output, a positive medium PI output and a positive large PI output, respectively.

In operation, for a given value of signal PIout, function set 150 provides seven membership function values 160, one value for each of the membership functions in set 150. Thus, set 150 provides values ns, nm, nl, ps, pm and pl which depend on the value of each membership function for the given PIout signal.

Function set 152 is like set 150 except that, instead of including seven membership functions, set 152 only includes two functions, positive and negative, each generating a unique membership, p and n, respectively. Membership values p and n are collectively referred to by the numeral 162.

Membership values 160 and 162 are provided to fuzzy rule set 154 which generates modified membership values. The modified membership values are provided to module 158 via a bus 164.

Rule set 154 includes rules for determining material density. Set 154 includes two rule sub-sets. A first sub-set includes rules to determine material density when the line speed is increasing. A second sub-set includes rules to determine material density when line speed is decreasing. The first sub-set includes the following rules:

(34) If PIout is zero then a corresponding modified membership value is zero;

(35) If dv/dt is positive and PIout is negative large then a corresponding modified membership value is (q*K.5) where q is the lesser of nl and p;

(36) If dv/dt is positive and PIout is negative medium then a corresponding modified membership value is (q*K.5) where q is the lesser of nm and p;

(37) If dv/dt is positive and PIout is negative small then a corresponding modified membership value is (q*K.666) where q is the lesser of ns and p;

(38) If dv/dt is positive and PIout is positive small then a corresponding modified membership value is (q*K1.5) where q is the lesser of ps and p;

(39) If dv/dt is positive and PIout is positive medium then a corresponding modified membership value is (q*K2) where q is the lesser of pm and p; and

(40) If dv/dt is positive and PIout is positive large then a corresponding modified membership value is (q*K2) where q is the lesser of pl and p.

The second sub-set includes the following rules:

(41) If dv/dt is negative and PIout is negative large then a corresponding modified membership value is (q*K2) where q is the lesser of nl and n;

(42) If dv/dt is negative and PIout is negative medium then a corresponding modified membership value is (q*K2) where q is the lesser of nm and n;

(43) If dv/dt is negative and PIout is negative small then a corresponding modified membership value is (q*K1.5) where q is the lesser of ns and n;

(44) If dv/dt is negative and PIout is positive small then a corresponding modified membership value is (q*K.666) where q is the lesser of ps and n;

(45) If dv/dt is negative and PIout is positive medium then a corresponding modified membership value is (q*K.5) where q is the lesser of pm and n; and

(46) If dv/dt is negative and PIout is positive large then a corresponding modified membership value is (q*K.5) where q is the lesser of pl and n.

To apply rules 34 through 46, where a membership value (i.e. nl, nm, ns, ps, pm, pl or z) is non-zero, the membership value is modified as indicated in the rules.

Module 158 adds modified membership values received thereby generating multiplier MDm.

Referring again to FIG. 2, multiplier MDm is provided to module 84 for additional processing. Initially, module 84 is provided with a typical MD value which might be expected given a typical winder material (e.g. steel). The typical MD value is stored as an initial MD value. During operation, when module 84 receives multiplier MDm, module 84 multiplies multiplier MDm by the initial MD value, generating an updated MD value. The updated value replaces the initial value and is also provided to compensator 40 (see FIG. 1) for control purposes.

D. WKA and WKD Kicker Tuner

Figure 7:
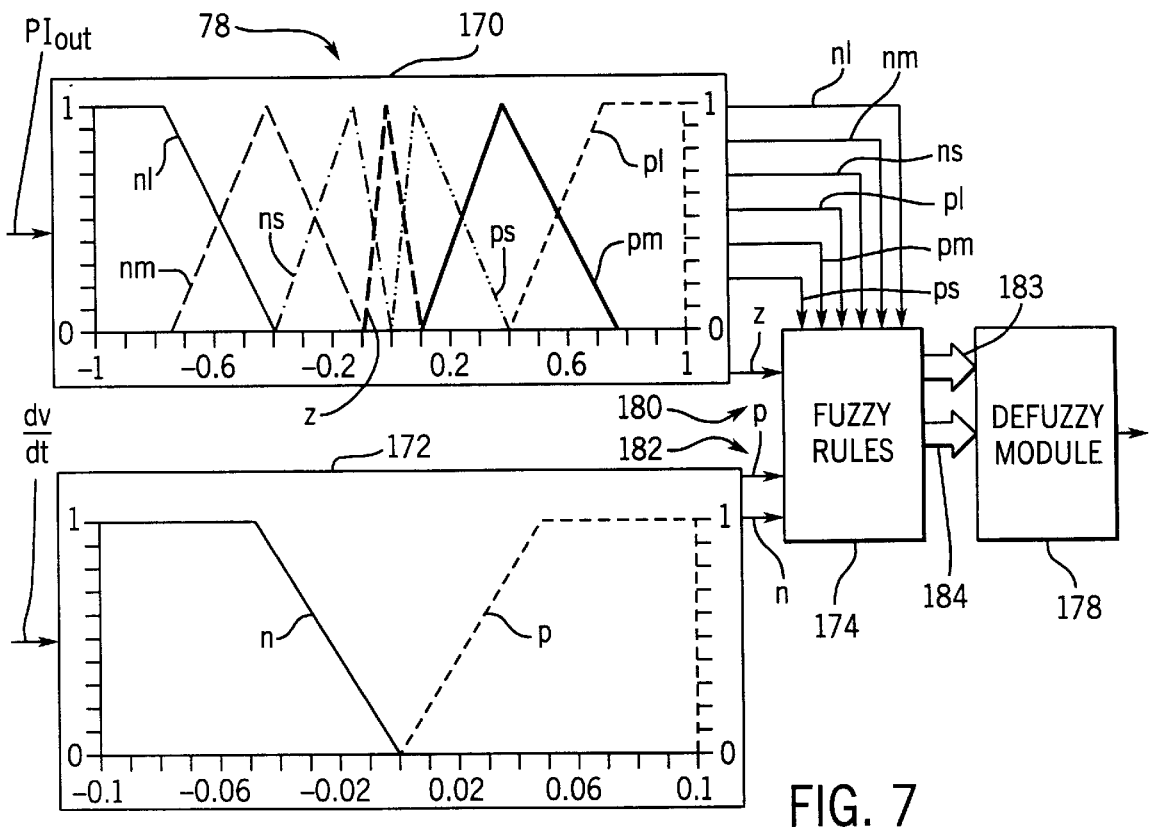
FIG. 7 is a block diagram illustrating the WKA/WKD tuner of FIG. 2.

Referring to FIGS. 2 and 7, tuner 78 receives acceleration signal dv/dt, diameter signal $D_1$ and signal PIout and uses those signals to generate acceleration and deceleration multipliers WKAm and WKDm, respectively, based on a set of fuzzy membership functions and fuzzy rules. Tuner 78 includes membership function sets 170 and 172, a fuzzy rule set 154 and a defuzzing module 158. Signal PIout is received by function set 170 while signal dv/dt is received by set 172.

Function set 170 comprises seven membership functions designated negative small ns, negative medium nm, negative large nl, positive small ps, positive medium pm and positive large pl corresponding generally to the fuzzy concepts of a negative small PI output, a negative medium PI output, a negative large PI output, a positive small PI output, a positive medium PI output and a positive large PI output, respectively.

In operation, for a given value of signal PIout, function set 170 provides seven membership function values 180, one value for each of the membership functions in set 170. Thus, set 170 provides values z, ns, nm, nl, ps, pm and pl which depend on the value of each membership function for the given PIout signal.

Function set 172 is like set 170 except that, instead of including seven membership functions, set 172 only includes two functions, positive and negative, each corresponding to a unique set 172 output, p and n, respectively. Membership values p and n are collectively referred to by the numeral 182.

Membership values 180 and 182 are provided to fuzzy rule set 174 which generates modified membership values.

Rule set 174 includes rules for determining how acceleration and deceleration kicker signals should be modified. Set 174 includes two rule sub-sets. A first sub-set includes rules to identify an acceleration multiplier WKAm when a line is accelerating. A second sub-set includes rules to identify a deceleration multiplier WKDm when a line is decelerating. The first sub-set includes the following rules:

(47) If PIout is zero then a corresponding modified membership value is zero;

(48) If dv/dt is positive and PIout is negative large then a corresponding modified membership value is (q*K.5) where q is the lesser of nl and p;

(49) If dv/dt is positive and PIout is negative medium then a corresponding modified membership value is (q*K.666) where q is the lesser of nm and p;

(50) If dv/dt is positive and PIout is negative small then a corresponding modified membership value is (q*K.8) where q is the lesser of ns and p;

(51) If dv/dt is positive and PIout is positive small then a corresponding modified membership value is (q*K1.25) where q is the lesser of ps and p;

(52) If dv/dt is positive and PIout is positive medium then a corresponding modified membership value is (q*K1.5) where q is the lesser of pm and p; and

(53) If dv/dt is positive and PIout is positive large then a corresponding modified membership value is (q*K2) where q is the lesser of pl and p.

The second sub-set includes the following rules:

(54) If PIout is zero then a corresponding modified membership value is zero;

(55) If dv/dt is negative and PIout is negative large then a corresponding modified membership value is (q*K2) where q is the lesser of nl and n;

(56) If dv/dt is negative and PIout is negative medium then a corresponding modified membership value is (q*K1.5) where q is the lesser of nm and n;

(57) If dv/dt is negative and PIout is negative small then a corresponding modified membership value is (q*K1.25) where q is the lesser of ns and n;

(58) If dv/dt is negative and PIout is positive small then a corresponding modified membership value is (q*K.8) where q is the lesser of ps and n;

(59) If dv/dt is negative and PIout is positive medium then a corresponding modified membership value is (q*K.666) where q is the lesser of pm and n; and

(60) If dv/dt is negative and PIout is positive large then a corresponding modified membership value is (q*K.5) where q is the lesser of pl and n.

To apply rules 47 through 60, where a membership value (i.e. nl, nm, ns, ps, pm, pl or z) is non-zero, the membership value is modified as indicated in the rules.

Membership values from rules 47 through 53 are provided to module 178 via a first bus 183 while values from rules 54 through 60 are provided to module 178 via a second bus 184. Module 178 adds values from bus 183 thereby generating multiplier WKAm. Similarly, module 178 adds values from bus 184 thereby generating multiplier WKDm.

Referring again to FIG. 2, multipliers WKAm and WKDm are provided to module 86 for additional processing. Initially, module 86 is provided with typical WKA and WKD values which might be expected given a typical winder configuration. The typical values are stored as initial WKA and WKD values. During operation, when module 86 receives multiplier WKAm, module 86 multiplies multiplier WKAm by the initial WKA value, generating an updated WKA value. The updated value replaces the initial value and is also provided to compensator 40 (see FIG. 1) for control purposes. Similarly, during operation, when module 86 receives multiplier WKDm, module 86 multiplies multiplier WKDm by the initial WKD value, generating an updated WKD value. The updated value replaces the initial value and is also provided to compensator 40 (see FIG. 1) for control purposes.

C. Commissioning

With the controller 10 configured as illustrated and described above, during a commissioning procedure without material attached to the spindle, motor 16 is driven so as to simulate acceleration and deceleration step commands while winder analyzer 30, regulator 32 and compensator 40 receive feedback signals and adjust control accordingly to facilitate changes in spindle rotation. To this end, referring again Eq. 6 above, $D_0 = D_1$ and therefore Eq. 6 simplifies to:

$$T_{cor} = SI^* \zeta \qquad \text{Eq. 9}$$

In this case analyzer 30 identifies both the spindle inertia signal SI and initial acceleration and deceleration kicker signals WKA and WKD, respectively (i.e. $\zeta$ is either WKA or WKD). These signals are stored in multiplier and limiter modules 82 and 86 (see FIG. 2) and are fine tuned later on during normal motor operation for winding purposes.

Next, material 24 is attached to the spindle and motor 16 is again driven while analyzer 30, regulator 32 and compensator 40 receive feedback signals and modify control signals. In this case, referring again to Eq. 6, because $D_0 \neq D_1$, compensator 40 solves Eq. 6 to provide the correction $T_{cor}$ on line 68. In addition to fine tuning spindle inertia signal SI and the acceleration and deceleration kicker signals, WKA and WKD, respectively analyzer 30 also identifies and fine tunes the material density signal MD which is provided to compensator 40 and is used in Eq. 6 above.

D. Results

Figure 8:
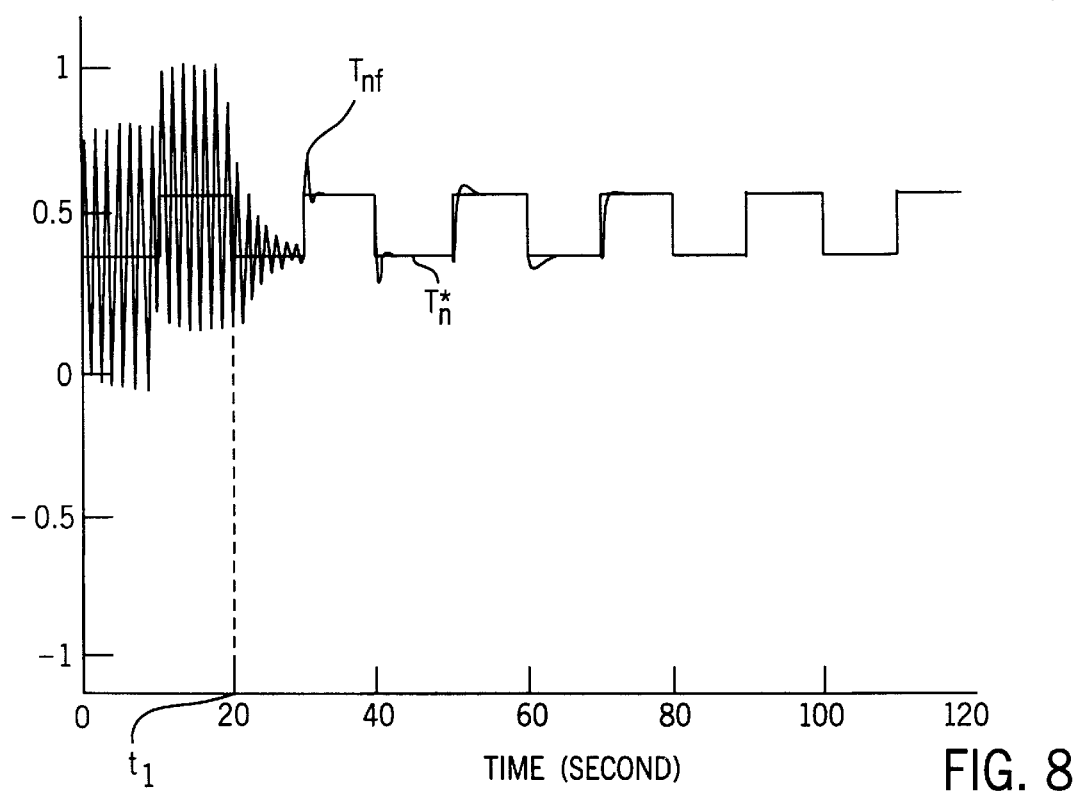
FIG. 8 is a graph illustrating a command tension signal and a feedback tension signal generated initially with unstable P and I-gain factors and then generated employing the inventive analyzer which tunes the gain factors.
Figure 9:
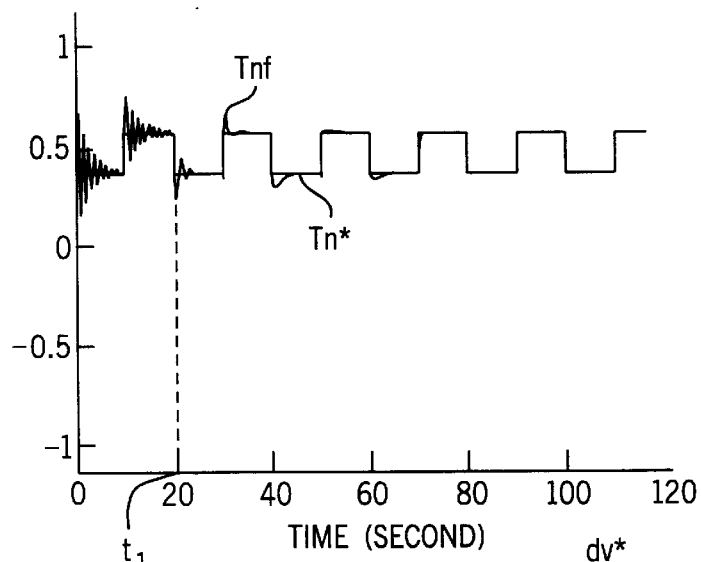
FIG. 9 is a graph similar to that of FIG. 8, albeit illustrating signals wherein initial P and I-gain factors were stable.

FIGS. 8 and 9 illustrate results of a PI tuning process using a controller according to the present invention. Each of FIGS. 8 and 9 show both a command tension signal Tn* and a tension feedback signal Tnf. Signal Tn* is initially set to 0.5 pu (1.0 pu=maximum tension). Signal Tn* was then changed by a +/−0.1 pu step every 10 seconds. To clearly illustrate the effect of the inventive fuzzy analyzer, the analyzer remained off for the first twenty seconds of each test, being turned on at time t1.

The results in FIG. 8 were generated with initially unstable P and I-gains. Prior to time t1, clearly the controller could not achieve steady state tension. After the analyzer was turned on (i.e. at 20 seconds), the PI tuner quickly stabilized control as P and I-gains were altered. After approximately 5 tuning cycles satisfactory control was achieved.

The results in FIG. 9 were generated with initially stable P and I-gains. However, prior to time t1, clearly it took the controller a relatively long time (i.e. essentially 10 seconds) to achieve the desired tension. After the analyzer was turned on (i.e. at 20 seconds), the PI tuner quickly stabilized control by fine tuning the P and I-gains and inertia compensator inputs to achieve satisfactory control.

Figure 10:
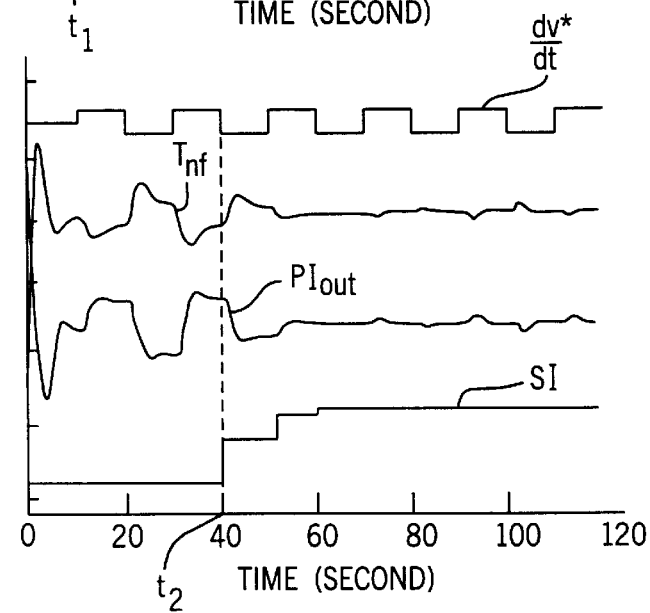
FIG. 10 is a graph illustrating a line speed reference signal, a tension feedback signal, a regulator output signal and a spindle inertia signal.

FIG. 10 illustrates results of the spindle inertia tuning process using the present invention. FIG. 10 includes a command line speed signal v*; a tension feedback signal Tnf, a PIout signal and a spindle inertia signal SI. In FIG. 10 the spindle inertia was initially set to 0.5 second while the actual inertia was 1.0 second. SI tuner 74 remained off until time t2 after 40 seconds. After only three tuning cycles the inertia value SI converged to and stabilized at the actual value of 1.0. Due to initial incorrect spindle inertia compensation (i.e. prior to time t2), tension Tnf caused by v* line speed changes was oscillatory. After correct spindle inertia compensation was achieved, tension Tnf was much more stable despite changes line speed v*.

Figure 11:
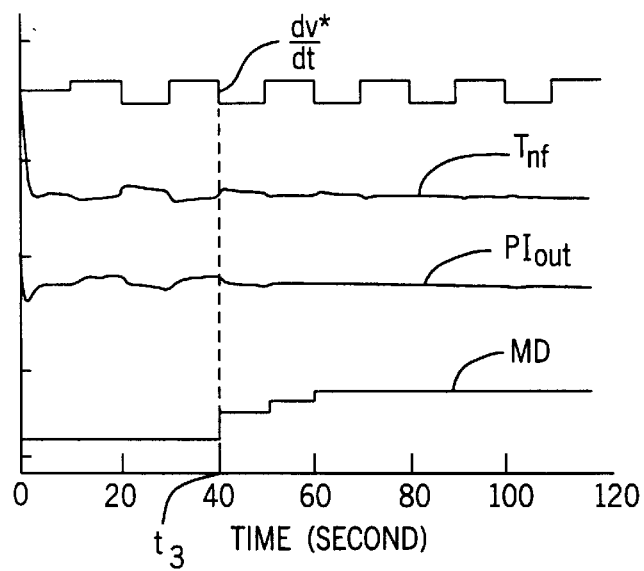
FIG. 11 is similar to FIG. 10, albeit with a material density signal replacing the spindle inertia signal.

FIG. 11 illustrates results of the material density identification process using the present invention. FIG. 11 includes a command line speed signal v*, a tension feedback signal Tnf, a PIout signal and a material density signal MD. In FIG. 11 the material density was initially set to an incorrect value. At time t3, after 40 seconds, MD tuner 76 was turned on. After only three tuning cycles the MD value converges to and stabilizes at an actual value. Due to initial incorrect material density MD (i.e. prior to time t3), tension Tnf resulting from line speed v* changes was oscillatory. After correct material density compensation was reached, tension Tnf was much more stable despite changes in speed v*.

Figure 12:
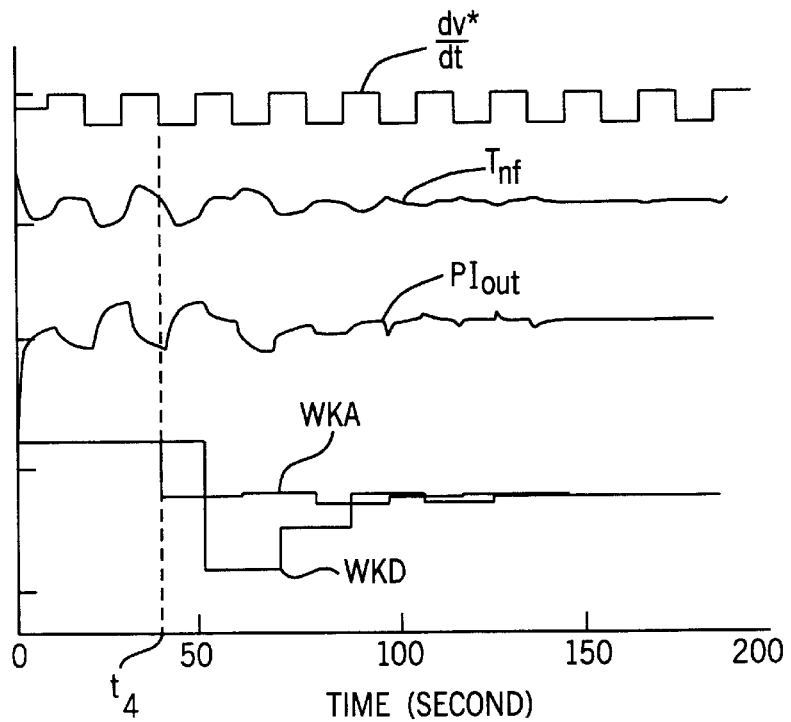
FIG. 12 is similar to FIG. 10, albeit including acceleration and deceleration kicker signals, WKA and WKD, respectively, instead of the spindle inertia signal, these signals generated with an unloaded spindle.

FIG. 12 illustrates results of the WKA/WKD tuning process with a spindle (i.e. unloaded). FIG. 12 includes a command line speed signal v*, a tension feedback speed Tnf, a PIout speed and a WKA/WKD speed. To see the results clearly, WKA and WKD were set to 1.2 and analyzer 30 was off until time 64. The final WKA and WKD values converge to 1.0 with satisfactory tension control in response to line speed acceleration and deceleration.

Figure 13:
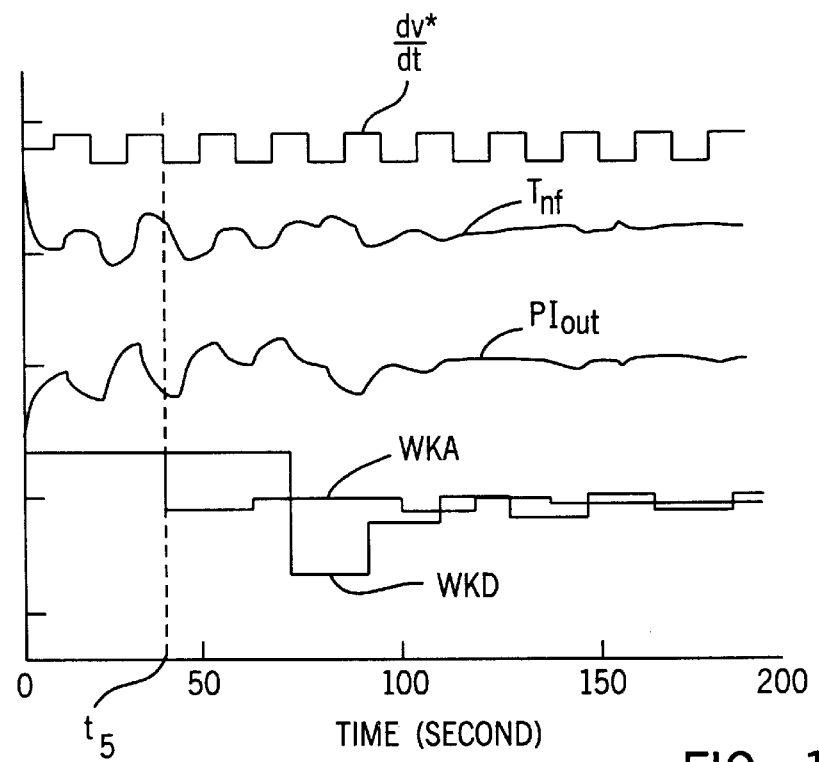
FIG. 13 is a graph similar to FIG. 12, albeit generated with a fully loaded spindle.

FIG. 13 illustrates results of the WKA/WKD tuning process with a fully loaded spindle and includes the same signals illustrated in FIG. 12. Once again, WKA and WKD were initially set to 1.2 and analyzer 30 was off until time t5. The final WKA and WKD values essentially converge to 1.0 with satisfactory tension control. Fine tuning of the fuzzy rule set could facilitate even better results.

It should be understood that the methods and apparatuses described above are only exemplary and do not limit the scope of the invention, and that various modifications could be made by those skilled in the art that would fall under the scope of the invention. For example, while the analyzer described above receives and responds to tension signals, clearly the same analyzer could be used to modify compensation signals provided to compensator 40 as a function of a position signal provided via a dancer (dancers are well known in the art). In addition, while the preferred embodiment includes fuzzy membership functions and corresponding rule sets for identifying spindle inertia, material density and acceleration and deceleration kickers, clearly, a more basic analyzer which uses fuzzy membership function sets and corresponding rule sets to find a subset of the spindle inertia, material density and kicker signals could be provided. Moreover, the inventive fuzzy analyzer could be used to control tension in line sections of material (i.e., between two rollers or pressure points) as opposed to material being would on a winder.

To apprise the public of the scope of this invention, we make the following claims:

We claim:

1. An apparatus for use with a roller system including a spindle for rolling material thereon, a motor for driving the spindle and a motor controller, the controller including a regulator, an inertia compensator and first and second summers, the controller providing a material tension error signal, the regulator receiving the error signal and generating a regulator output signal as a function of at least one regulator variable, the first summer adding the error and output signals to provide a torque command signal, the inertia compensator using compensation signals to generate a torque correction signal, the second summer adding the command torque and torque correction signals to provide a modified torque signal for motor control, the controller also providing a plurality of tuning signals including a tension reference signal, an acceleration signal, a roll diameter signal and a tension feedback signal, the regulator output also being a tuning signal, the apparatus for providing compensation signals and regulator variables such that a reference material tension is maintained, the apparatus comprising:

a fuzzy logic analyzer including at least one set of fuzzy membership functions at least one set of fuzzy rules, the analyzer applying the fuzzy functions and rules to at least a subset of the tuning signals to produce the at least one regulator variable and at least one compensation signal, the compensation signal provided to the compensator.

2. An apparatus for use with a roller system including a spindle for rolling material thereon, a motor for driving the spindle and a motor controller, the controller including a regulator, an inertia compensator and first and second summers, the controller providing a material tension error signal, the regulator being a proportional-integral controller and receiving the error signal and generating a regulator output signal as a function of at least one regulator variable, the at least one regulator variable includes both a proportional gain factor and an integral gain factor, the first summer adding the error and output signals to provide a torque command signal, the inertia compensator using compensation signals to generate a torque correction signal, the second summer adding the command torque and torque correction signals to provide a modified torque signal for motor control, the controller also providing a plurality of tuning signals including a tension reference signal, an acceleration signal, a roll diameter signal and a tension feedback signal, the regulator output also being a tuning signal, the apparatus for providing compensation signals and regulator variables such that a reference material tension is maintained, the apparatus comprising:

a fuzzy logic analyzer including at least one set of fuzzy membership functions and at least one set of fuzzy rules, the analyzer applying the fuzzy functions and rules to at least a subset of the tuning signals to produce the at least one regulator variable and at least one compensation signal, the at least one set of fuzzy membership functions and at least one set of fuzzy rules including at least one set of functions and corresponding rules for determining the proportional and integral gain factors, the compensation signal provided to the compensator.

3. The apparatus of claim 2 wherein the analyzer includes a pattern identifier which uses the tension command and tension feedback signals to generate rise time, long time, frequency, overshoot and steady state error signals, and the at least one set of fuzzy membership functions and corresponding set of fuzzy rules for determining the gain factors includes five function sets and five corresponding rule sets, a separate membership function set and rule set corresponding to each of rise time, long time, frequency, overshoot and steady state error signals.

4. The apparatus of claim 3 wherein the analyzer further includes proportional and integral defuzzer modules and a limiter, the limiter storing initial proportional and integral gain factors, the proportional module receiving the outputs of rule sets associated with the rise time signal and the frequency signal and using those outputs to generate a proportional gain factor multiplier, the integral module receiving the outputs of rule sets associated with the long time signal, the frequency signal, the over shoot signal and the steady state error signal and using those outputs to generate an integral gain factor multiplier, the limiter mathematically combining the proportional and integral gain factor multipliers with the initial proportional and integral gain factors to generate updated proportional and integral gain factors, respectively, the updated factors stored as the initial factors in the limiter and provided to the regulator for control.

5. The apparatus of claim 4 wherein the limiter mathematically combines by multiplying.

6. The apparatus of claim 2 wherein the controller provides both a roll diameter signal and an acceleration signal, the compensation signals include a spindle inertia signal, a material density signal, an acceleration kicker signal, a deceleration kicker signal, the acceleration signal and the roll diameter signal and the analyzer includes fuzzy membership functions and fuzzy rule sets and defuzzers which cooperate to generate each of the spindle inertia, material density, acceleration kicker and deceleration kicker signals.

7. An apparatus for use with a roller system including a spindle for rolling material thereon, a motor for driving the spindle and a motor controller, the controller including a regulator, an inertia compensator and first and second summers, the controller providing a material tension error signal, the regulator receiving the error signal and generating a regulator output signal as a function of at least one regulator variable, the first summer adding the error and output signals to provide a torque command signal, the inertia compensator using compensation signals to generate a torque correction signal, the second summer adding the command torque and torque correction signals to provide a modified torque signal for motor control, the controller also providing a plurality of tuning signals including a tension reference signal, an acceleration signal, a roll diameter signal and a tension feedback signal, the regulator output also being a tuning signal, the apparatus for providing compensation signals and regulator variables such that a reference material tension is maintained, the apparatus comprising:

a fuzzy logic analyzer including at least one set of fuzzy membership functions at least one set of fuzzy rules, the analyzer applying the fuzzy functions and rules to at least a subset of the tuning signals to produce the at least one regulator variable and at least one compensation signal, the compensation signal provided to the compensator and, wherein, the compensation signal includes at least a spindle inertia signal, the analyzer includes at least one set of fuzzy membership functions, a corresponding set of fuzzy rules and a defuzzer module which cooperate to generate the spindle inertia signal.

8. The apparatus of claim 7 wherein the analyzer further includes a limiter which stores an initial spindle inertia signal, the at least one set of fuzzy membership functions for generating the spindle inertia signal include two function sets, a separate function set corresponding to each of the regulator output signal and the acceleration signal and the fuzzy rule set includes a single rule set which receives the outputs from the function sets corresponding to both the regulator output signal and the acceleration signal and provides a rule set output, the defuzzer module receiving the outputs of the rule set and using those outputs to generate a spindle inertia multiplier, the limiter mathematically combining the spindle inertia multiplier with the initial spindle inertia signal generating an updated spindle inertia signal, the updated signal stored as the initial spindle inertia signal and provided to the compensator for control.

9. The apparatus of claim 8 wherein the limiter mathematically combines by multiplying.

10. An apparatus for use with a roller system including a spindle for rolling material thereon, a motor for driving the spindle and a motor controller, the controller including a regulator, an inertia compensator and first and second summers, the controller providing a material tension error signal, the regulator receiving the error signal and generating a regulator output signal as a function of at least one regulator variable, the first summer adding the error and output signals to provide a torque command signal, the inertia compensator using compensation signals to generate a torque correction signal, the second summer adding the command torque and torque correction signals to provide a modified torque signal for motor control, the controller also providing a plurality of tuning signals including a tension reference signal, an acceleration signal, a roll diameter signal and a tension feedback signal, the regulator output also being a tuning signal, the apparatus for providing compensation signals and regulator variables such that a reference material tension is maintained, the apparatus comprising:

a fuzzy logic analyzer including at least one set of fuzzy membership functions at least one set of fuzzy rules, the analyzer applying the fuzzy functions and rules to at least a subset of the tuning signals to produce the at least one regulator variable and at least one compensation signal, the compensation signal provided to the compensator and, wherein, the compensation signal includes at least a material density signal, the analyzer includes at least one set of fuzzy membership functions, a corresponding set of fuzzy rules and a defuzzer module which cooperate to generate the material density signal.

11. The apparatus of claim 10 wherein the analyzer further includes a limiter which stores an initial material density signal, the at least one set of fuzzy membership functions for generating the material density signal include two function sets, a separate function set corresponding to each of the regulator output signal and the acceleration signal and the fuzzy rule set includes a single rule set which receives the outputs from the function sets corresponding to both the regulator output signal and the acceleration signal and provides a rule set output, the defuzzer module receiving the outputs of the rule set and using those outputs to generate a material density multiplier, the limiter mathematically combining the material density multiplier with the initial material density signal generating an updated material density signal, the updated signal stored as the initial material density signal and provided to the compensator for control.

12. The apparatus of claim 11 wherein the limiter mathematically combines by multiplying.

13. An apparatus for use with a roller system including a spindle for rolling material thereon, a motor for driving the spindle and a motor controller, the controller including a regulator, an inertia compensator and first and second summers, the controller providing a material tension error signal, the regulator receiving the error signal and generating a regulator output signal as a function of at least one regulator variable, the first summer adding the error and output signals to provide a torque command signal, the inertia compensator using compensation signals to generate a torque correction signal, the second summer adding the command torque and torque correction signals to provide a modified torque signal for motor control, the controller also providing a plurality of tuning signals including a tension reference signal, an acceleration signal, a roll diameter signal and a tension feedback signal, the regulator output also being a tuning signal, the apparatus for providing compensation signals and regulator variables such that a reference material tension is maintained, the apparatus comprising:

a fuzzy logic analyzer including at least one set of fuzzy membership functions at least one set of fuzzy rules, the analyzer applying the fuzzy functions and rules to at least a subset of the tuning signals to produce the at least one regulator variable and at least one compensation signal, the compensation signal provided to the compensator and, wherein, the compensation signal includes at least an acceleration kicker signal, the analyzer includes at least one set of fuzzy membership functions, a corresponding set of fuzzy rules and a defuzzer module which cooperate to generate the acceleration kicker signal.

14. The apparatus of claim 13 wherein the analyzer further includes a limiter which stores an initial acceleration kicker signal, the at least one set of fuzzy membership functions for generating the acceleration kicker signal include two function sets, a separate function set corresponding to each of the regulator output signal and the acceleration signal and the fuzzy rule set includes a single rule set which receives the outputs from the function sets corresponding to both the regulator output signal and the acceleration signal and provides a rule set output, the defuzzer module receiving the outputs of the rule set and using those outputs to generate a acceleration kicker multiplier, the limiter mathematically combining the acceleration kicker multiplier with the initial acceleration kicker signal generating an updated acceleration kicker signal, the updated signal stored as the initial acceleration kicker signal and provided to the compensator for control.

15. The apparatus of claim 14 wherein the limiter mathematically combines by multiplying.

16. An apparatus for use with a roller system including a spindle for rolling material thereon, a motor for driving the spindle and a motor controller, the controller including a regulator, an inertia compensator and first and second summers, the controller providing a material tension error signal, the regulator receiving the error signal and generating a regulator output signal as a function of at least one regulator variable, the first summer adding the error and output signals to provide a torque command signal, the inertia compensator using compensation signals to generate a torque correction signal, the second summer adding the command torque and torque correction signals to provide a modified torque signal for motor control, the controller also providing a plurality of tuning signals including a tension reference signal, an acceleration signal, a roll diameter signal and a tension feedback signal, the regulator output also being a tuning signal, the apparatus for providing compensation signals and regulator variables such that a reference material tension is maintained, the apparatus comprising:

a fuzzy logic analyzer including at least one set of fuzzy membership functions at least one set of fuzzy rules, the analyzer applying the fuzzy functions and rules to at least a subset of the tuning signals to produce the at least one regulator variable and at least one compensation signal, the compensation signal provided to the compensator and, wherein, the compensation signal includes at least a deceleration kicker signal, the analyzer includes at least one set of fuzzy membership functions, a corresponding set of fuzzy rules and a defuzzer module which cooperate to generate the deceleration kicker signal.

17. The apparatus of claim 16 wherein the analyzer further includes a limiter which stores an initial deceleration kicker signal, the at least one set of fuzzy membership functions for generating the deceleration kicker signal include two function sets, a separate function set corresponding to each of the regulator output signal and the acceleration signal and the fuzzy rule set includes a single rule set which receives the outputs from the function sets corresponding to both the regulator output signal and the acceleration signal and provides a rule set output, the defuzzer module receiving the outputs of the rule set and using those outputs to generate a deceleration kicker multiplier, the limiter mathematically combining the deceleration kicker multiplier with the initial deceleration kicker signal generating an updated deceleration kicker signal, the updated signal stored as the initial deceleration kicker signal and provided to the compensator for control.

18. The apparatus of claim 16 wherein the limiter mathematically combines by multiplying.

19. A method for use with a roller system including a spindle for rolling material thereon, a motor for driving the spindle and a motor controller, the controller including a regulator, an inertia compensator and first and second summers, the controller providing a material tension error signal, the regulator receiving the error signal and generating a regulator output signal as a function of at least one regulator variable, the first summer adding the error and output signals to provide a torque command signal, the inertia compensator using compensation signals to generate a torque correction signal, the second summer adding the command torque and torque correction signals to provide a modified torque signal for motor control, the controller also providing a plurality of tuning signals including a tension reference signal, an acceleration signal, a roll diameter signal and a tension feedback signal, the regulator output also being a tuning signal, the method for providing compensation signals and regulator variables such that a reference material tension is maintained, the method comprising the steps of:

applying fuzzy functions and rules to at least a subset of the tuning signals to produce the at least one regulator variable and at least one compensation signal and providing the compensation signal to the compensator.

20. A method for use with a roller system including a spindle for rolling material thereon, a motor for driving the spindle and a motor controller, the controller including a regulator, an inertia compensator and first and second summers, the controller providing a material tension error signal, the regulator being a proportional-integral controller and receiving the error signal and generating a regulator output signal as a function of at least one regulator variable, the first summer adding the error and output signals to provide a torque command signal, the inertia compensator using compensation signals to generate a torque correction signal, the second summer adding the command torque and torque correction signals to provide a modified torque signal for motor control, the controller also providing a plurality of tuning signals including a tension reference signal, an acceleration signal, a roll diameter signal and a tension feedback signal, the regulator output also being a tuning signal, the method for providing compensation signals and regulator variables such that a reference material tension is maintained, the method comprising the steps of:

applying fuzzy functions and rules to at least a subset of the tuning signals to produce the at least one regulator variable and at least one compensation signal and providing the compensation signal to the compensator, the at least one regulator variable includes both a proportional gain factor and an integral gain factor and the step of applying includes the steps of applying at least one set of fuzzy membership functions and rules to determine the proportional and integral gain factors.

21. The method of claim 20 further including, prior to applying, comparing the tension feedback and command tension signals to generate rise time, long time, frequency, overshoot and steady state error signals, and the step of applying at least one function set and a corresponding rule set includes applying five separate function sets and corresponding rule sets, one function set and corresponding rule set associated with each of the rise time, long time, frequency, overshoot and steady state error signals.

22. The method of claim 21 wherein the controller also includes a limiter which stores initial proportional and integral gain factors and the method further includes the steps of, after applying, defuzzing outputs of the rule sets to generate proportional and integral gain factor multipliers, mathematically combining the proportional and integral multipliers with the initial proportional and integral gain factors to generate updated gain factors, storing the updated gain factors as the initial gain factors and providing the updated gain factors to the regulator for control.

23. The method of claim 22 wherein the step of mathematically combining includes multiplying.

24. A method for use with a roller system including a spindle for rolling material thereon, a motor for driving the spindle and a motor controller, the controller including a regulator, an inertia compensator, first and second summers and a limiter which stores an initial spindle inertia signal, the controller providing a material tension error signal, the regulator receiving the error signal and generating a regulator output signal as a function of at least one regulator variable, the first summer adding the error and output signals to provide a torque command signal, the inertia compensator using compensation signals to generate a torque correction signal, the second summer adding the command torque and torque correction signals to provide a modified torque signal for motor control, the controller also providing a plurality of tuning signals including a tension reference signal, an acceleration signal, a roll diameter signal and a tension feedback signal, the regulator output also being a tuning signal, the method for providing compensation signals and regulator variables such that a reference material tension is maintained, the method comprising the steps of:

applying at least one set of fuzzy membership functions and a corresponding set of fuzzy rules to a subset of tuning signals to generate a spindle inertia signal, defuzzing the function outputs to generate a spindle inertia multiplier, mathematically combining the spindle inertia multiplier with the initial spindle inertia signal generating an updated spindle inertia signal, storing the updated signal as the initial signal and providing the updated signal to the compensator.

25. The method of claim 24 wherein the step of applying to generate the spindle inertia signal includes applying two function sets, a separate function set corresponding to each of the regulator output signal and the acceleration signal and applying a single rule set to the outputs from the function sets corresponding to both the regulator output signal and the acceleration signal.

26. The method of claim 24 wherein the limiter mathematically combines by multiplying.

27. A method for use with a roller system including a spindle for rolling material thereon, a motor for driving the spindle and a motor controller, the controller including a regulator, an inertia compensator, first and second summers and a limiter which stores an initial material density signal, the controller providing a material tension error signal, the regulator receiving the error signal and generating a regulator output signal as a function of at least one regulator variable, the first summer adding the error and output signals to provide a torque command signal, the inertia compensator using compensation signals to generate a torque correction signal, the second summer adding the command torque and torque correction signals to provide a modified torque signal for motor control, the controller also providing a plurality of tuning signals including a tension reference signal, an acceleration signal, a roll diameter signal and a tension feedback signal, the regulator output also being a tuning signal, the method for providing compensation signals and regulator variables such that a reference material tension is maintained, the method comprising the steps of:

applying at least one set of fuzzy membership functions and a corresponding set of fuzzy rules to a subset of tuning signals to generate a material density signal; defuzzing the function outputs to generate a material density multiplier, mathematically combining the material density multiplier with the initial material density signal generating an updated material density signal, storing the updated signal as the initial signal and providing the updated signal to the compensator.

28. The method of claim 27 wherein the step of applying to generate the material density signal includes applying two function sets, a separate function set corresponding to each of the regulator output signal and the acceleration signal and applying a single rule set to the outputs from the function sets corresponding to both the regulator output signal and the acceleration signal.

29. The method of claim 27 wherein the limiter mathematically combines by multiplying.

30. A method for use with a roller system including a spindle for rolling material thereon, a motor for driving the spindle and a motor controller, the controller including a regulator, an inertia compensator, first and second summers and a limiter which stores an initial acceleration kicker signal, the controller providing a material tension error signal, the regulator receiving the error signal and generating a regulator output signal as a function of at least one regulator variable, the first summer adding the error and output signals to provide a torque command signal, the inertia compensator using compensation signals to generate a torque correction signal, the second summer adding the command torgue and torque correction signals to provide a modified torque signal for motor control, the controller also providing a plurality of tuning signals including a tension reference signal, an acceleration signal, a roll diameter signal and a tension feedback signal, the regulator output also being a tuning signal, the method for providing compensation signals and regulator variables such that a reference material tension is maintained, the method comprising the steps of:

applying at least one set of fuzzy membership functions and a corresponding set of fuzzy rules to a subset of tuning signals to generate a acceleration kicker signal; defuzzing the function outputs to generate a acceleration kicker signal multiplier, mathematically combining the acceleration kicker signal multiplier with the initial acceleration kicker signal generating an updated acceleration kicker signal, storing the updated signal as the initial signal and providing the updated signal to the compensator.

31. The method of claim 30 wherein the step of applying to generate the acceleration kicker signal includes applying two function sets, a separate function set corresponding to each of the regulator output signal and the acceleration signal and applying a single rule set to the outputs from the function sets corresponding to both the regulator output signal and the acceleration signal.

32. The method of claim 30 wherein the limiter mathematically combines by multiplying.

33. The method of claim 30 wherein the step of applying to generate the deceleration kicker signal includes applying two function sets, a separate function set corresponding to each of the regulator output signal and the acceleration signal and applying a single rule set to the outputs from the function sets corresponding to both the regulator output signal and the acceleration signal.

34. The method of claim 30 wherein the limiter mathematically combines by multiplying.

35. A method for use with a roller system including a spindle for rolling material thereon, a motor for driving the spindle and a motor controller, the controller including a regulator, an inertia compensator, first and second summers and a limiter which stores an initial deceleration kicker signal, the controller providing a material tension error signal, the regulator receiving the error signal and generating a regulator output signal as a function of at least one regulator variable, the first summer adding the error and output signals to provide a torque command signal, the inertia compensator using compensation signals to generate a torque correction signal, the second summer adding the command torque and torque correction signals to provide a modified torque signal for motor control, the controller also providing a plurality of tuning signals including a tension reference signal, an deceleration signal, a roll diameter signal and a tension feedback signal, the regulator output also being a tuning signal, the method for providing compensation signals and regulator variables such that a reference material tension is maintained, the method comprising the steps of:

applying at least one set of fuzzy membership functions and a corresponding set of fuzzy rules to a subset of tuning signals to generate a deceleration kicker signals; defuzzing the function outputs to generate a deceleration kicker signal multiplier, mathematically combining the deceleration kicker signal multiplier with the initial deceleration kicker signal generating an updated deceleration kicker signal, storing the updated signal as the initial signal and providing the updated signal to the compensator.

* * * * *